(12) United States Patent
Huang

(10) Patent No.: US 6,843,732 B1
(45) Date of Patent: Jan. 18, 2005

(54) MULTI-SEGMENT SINGLE PANEL GRIP

(76) Inventor: Ben Huang, P.O. Box 1936, Huntington Beach, CA (US) 92647

( * ) Notice: Subject to any disclaimer, the term of this patent is extended or adjusted under 35 U.S.C. 154(b) by 0 days.

(21) Appl. No.: 10/746,764

(22) Filed: Dec. 23, 2003

(51) Int. Cl.$^7$ .............................................. A63B 53/14
(52) U.S. Cl. ..................................................... 473/300
(58) Field of Search ................................ 473/300–303, 473/523, 549, 551, 552, 568; D21/756, 758; 74/551.9; 81/489; 16/421, 430

(56) References Cited

U.S. PATENT DOCUMENTS

| | | |
|---|---|---|
| 571,025 A | 11/1896 | Spamer |
| 979,266 A * | 12/1910 | Dean ............................ 473/568 |
| 1,008,604 A | 11/1911 | Lake |
| 1,345,505 A | 7/1920 | Persons |
| 1,617,972 A | 2/1927 | Wallace |
| 1,890,037 A | 12/1932 | Johnson |
| 2,221,421 A | 11/1940 | Curry |
| 2,449,575 A | 9/1948 | Wilhelm |
| 2,523,637 A | 9/1950 | Stanfield et al. |
| 2,690,338 A | 9/1954 | Brocke |
| 2,984,486 A | 5/1961 | Jones |
| 3,095,198 A | 6/1963 | Gasche |
| 3,311,375 A | 3/1967 | Onions |
| 4,052,061 A | 10/1977 | Stewart |
| 4,133,529 A | 1/1979 | Gambino |
| 4,651,991 A | 3/1987 | McDuff |
| 4,662,415 A | 5/1987 | Proutt |
| 4,878,667 A | 11/1989 | Tosti |
| 4,919,420 A | 4/1990 | Sato |
| 4,941,232 A | 7/1990 | Decker et al. |
| 5,118,107 A | 6/1992 | Bucher |
| 5,123,646 A | 6/1992 | Overby et al. |
| 5,127,650 A * | 7/1992 | Schneller ..................... 473/204 |
| 5,469,601 A | 11/1995 | Jackson |
| 5,511,445 A | 4/1996 | Hildebrandt |
| 5,570,884 A | 11/1996 | Carps |
| 5,577,722 A * | 11/1996 | Glassberg ................... 473/457 |
| 5,584,482 A | 12/1996 | Huang |
| 5,611,533 A | 3/1997 | Williams |
| 5,624,116 A | 4/1997 | Yeh |
| 5,626,527 A | 5/1997 | Eberlein |
| 5,797,813 A | 8/1998 | Huang |
| 5,839,983 A * | 11/1998 | Kramer ....................... 473/568 |
| 5,890,260 A | 4/1999 | Gaunt |
| 5,890,972 A | 4/1999 | Huang |
| 6,036,607 A | 3/2000 | Finegan |
| 6,226,836 B1 * | 5/2001 | Yasui ........................... 16/421 |
| 6,503,153 B2 | 1/2003 | Wang |
| 6,506,128 B1 * | 1/2003 | Bloom, Jr. ................... 473/292 |
| 6,558,270 B2 | 5/2003 | Kwitek |
| 6,666,777 B1 * | 12/2003 | Lamkin et al. ............. 473/300 |
| 2002/0142858 A1 * | 10/2002 | Chen .......................... 473/301 |
| 2003/0045370 A1 * | 3/2003 | Jaw ............................. 473/302 |
| 2003/0148836 A1 | 8/2003 | Falone et al. |
| 2003/0150081 A1 | 8/2003 | Wang |
| 2003/0216192 A1 * | 11/2003 | Chu ............................ 473/300 |

* cited by examiner

Primary Examiner—Stephen Blau
(74) Attorney, Agent, or Firm—Knobbe, Martens Olson & Bear LLP

(57) ABSTRACT

A grip for the handle of a golf club having multiple two layer panels that are wrapped about an underlisting sleeve. The edges of the panels are adhesively sealed together. The grip reduces impact and shock and provides a feeling of tackiness in the manner of a spirally wrapped polyurethane-felt grip while allowing the use of multiple color panels and easy instillation onto a golf club shaft.

84 Claims, 29 Drawing Sheets

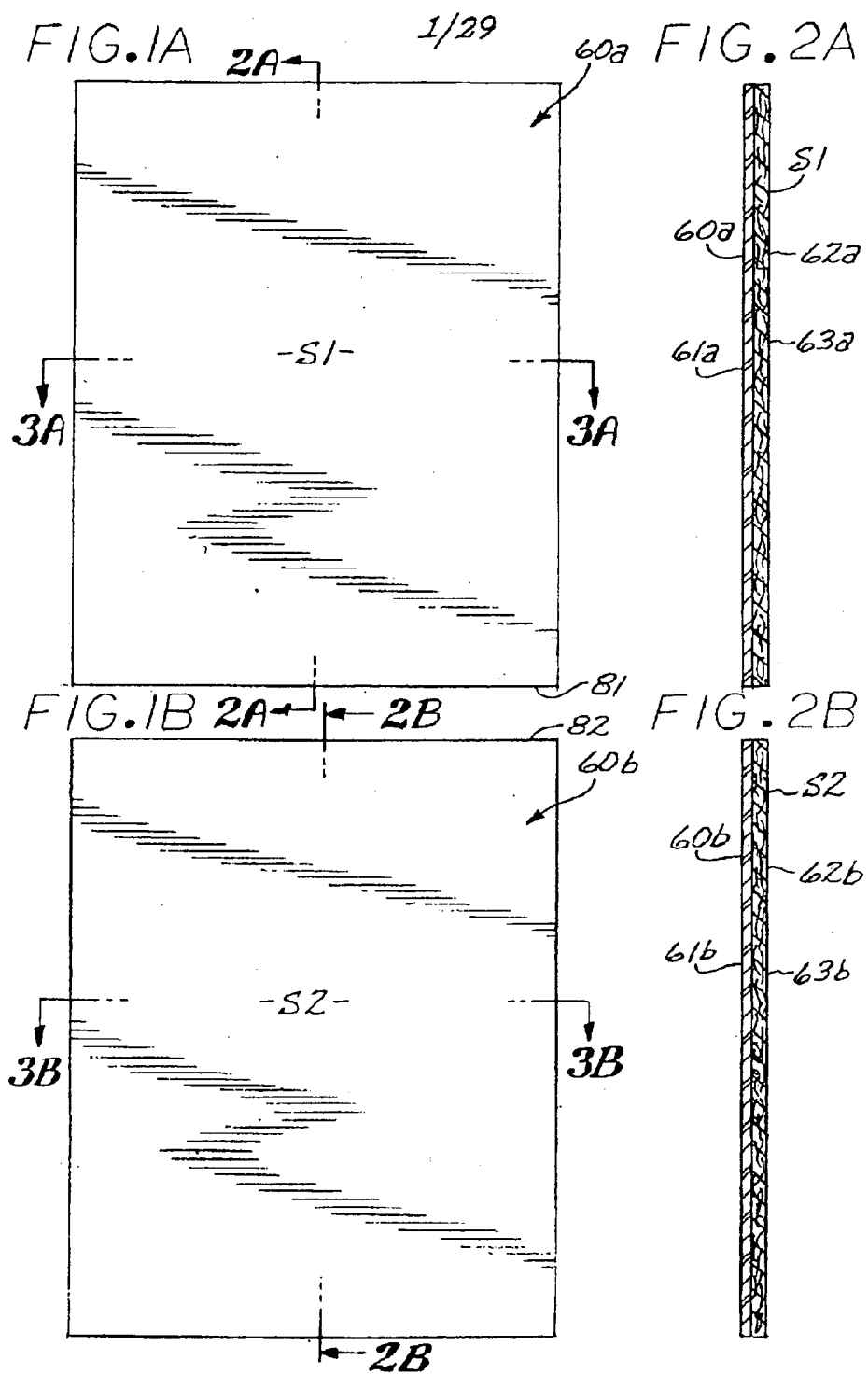

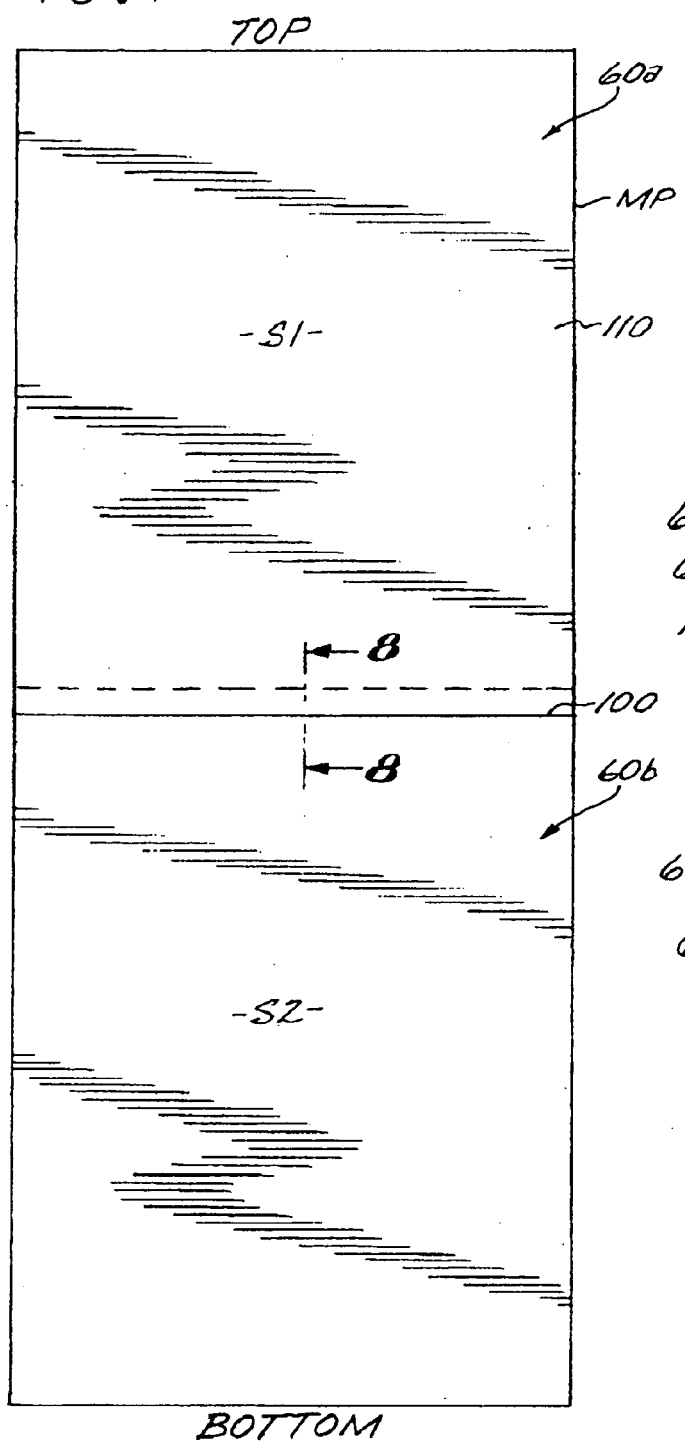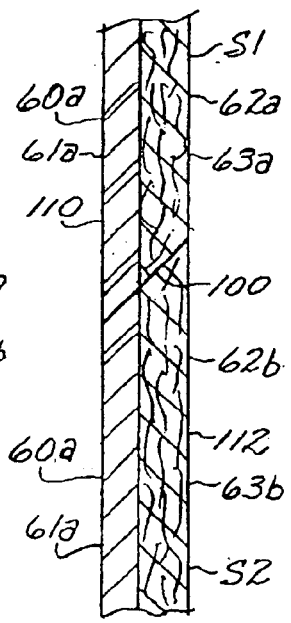

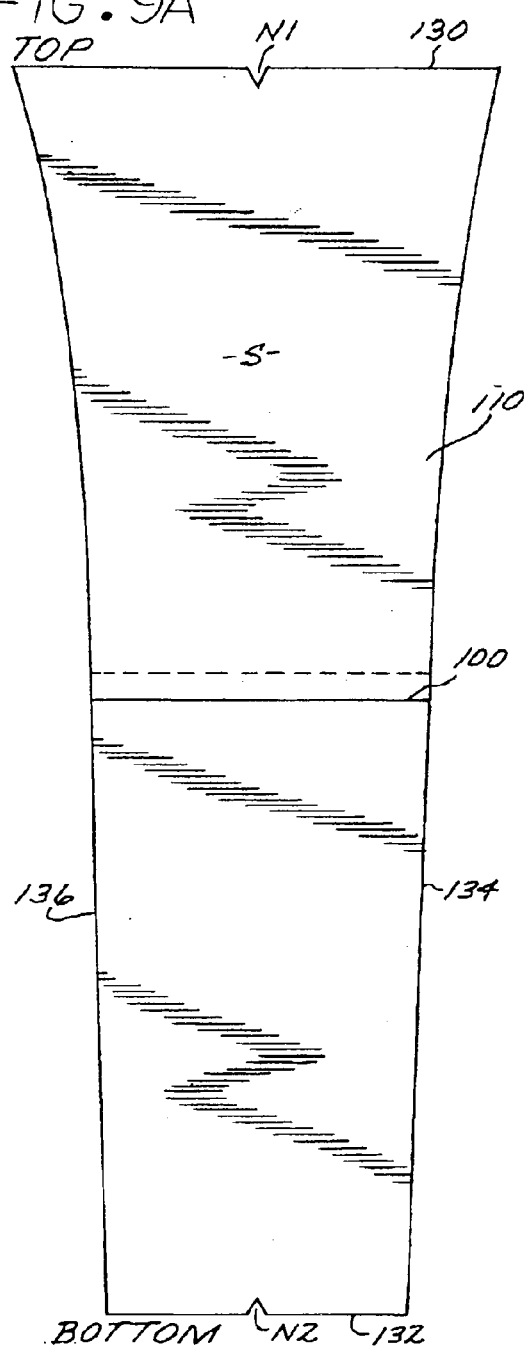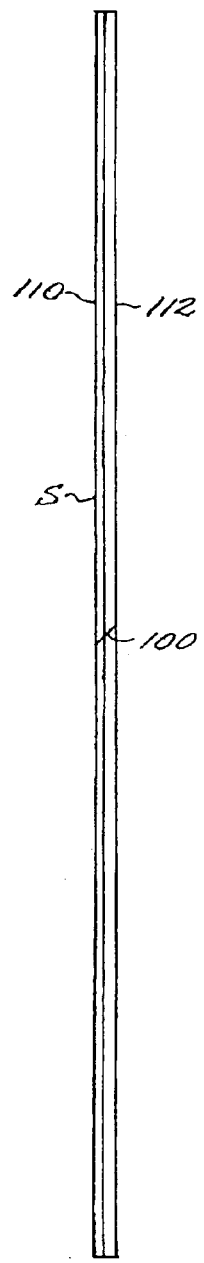

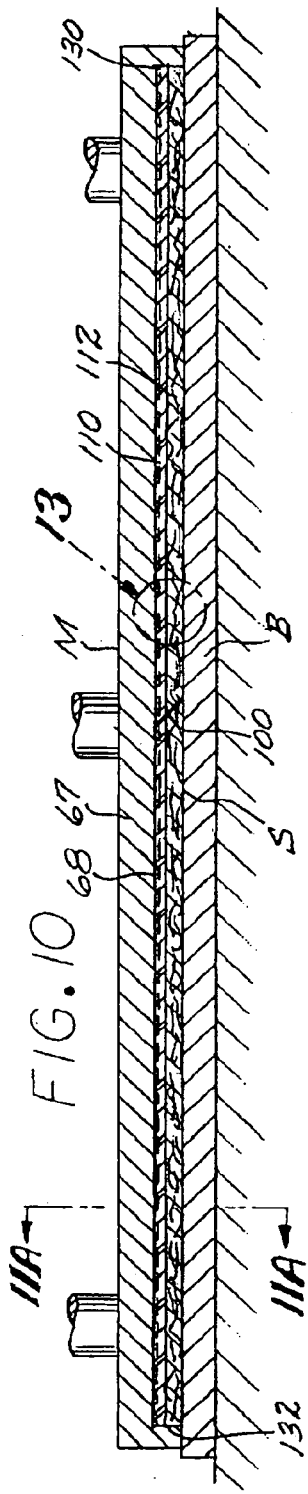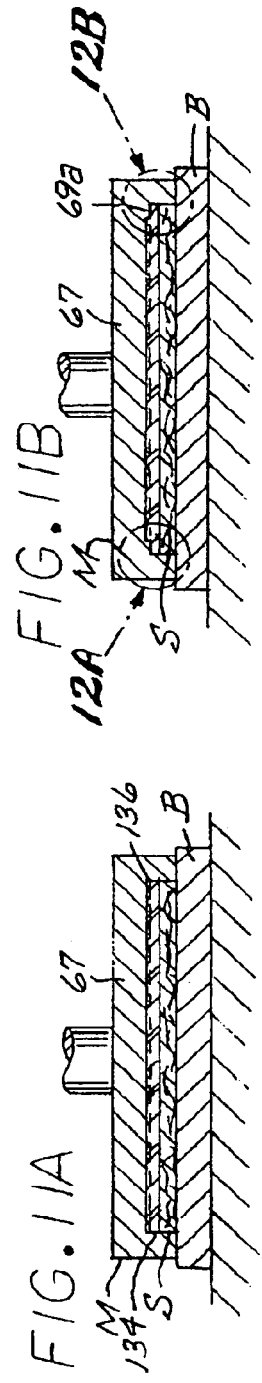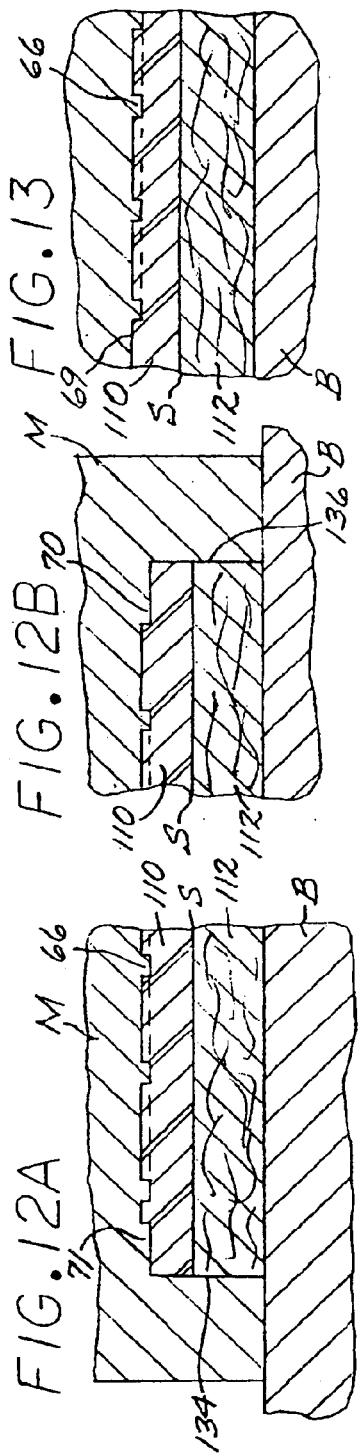

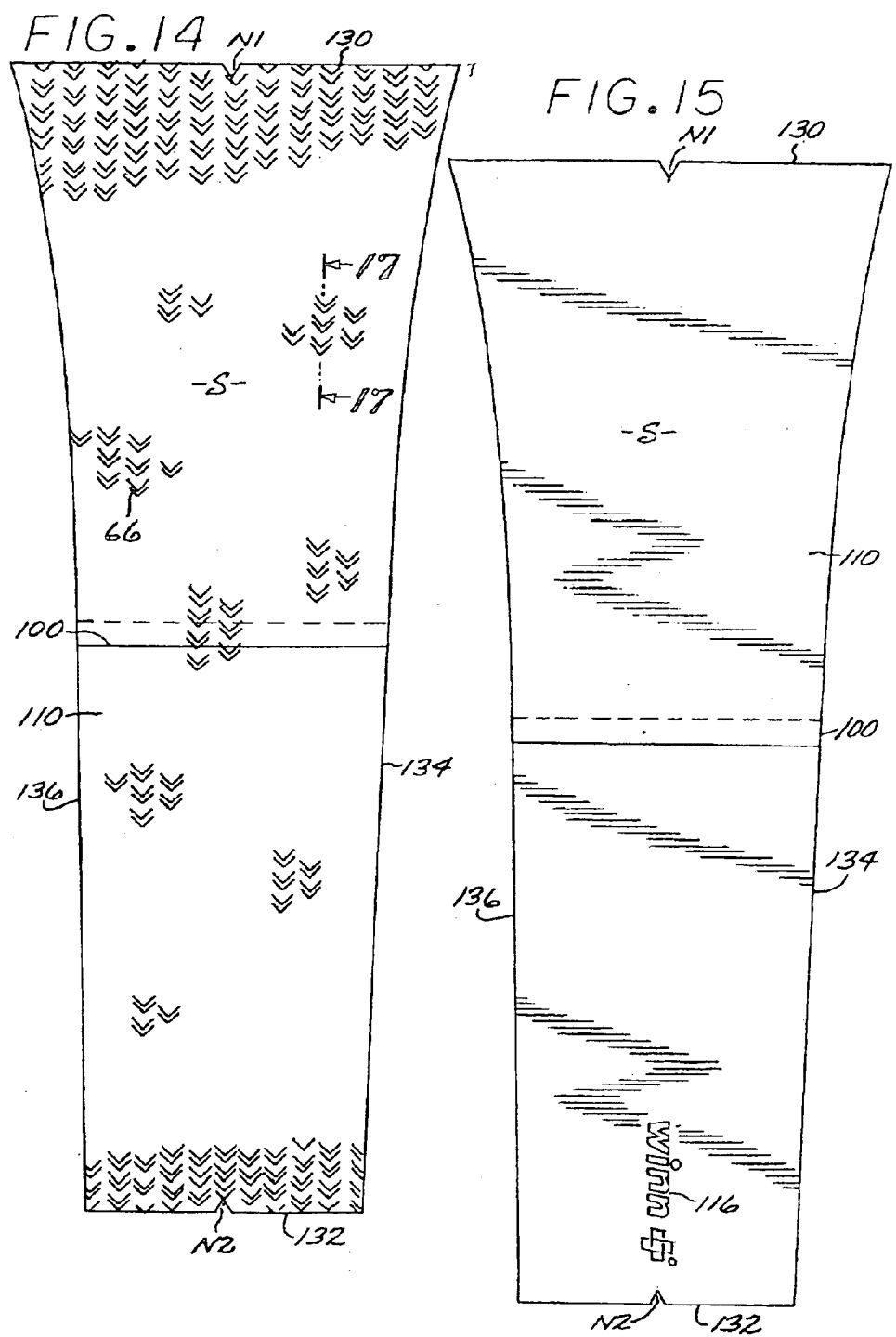

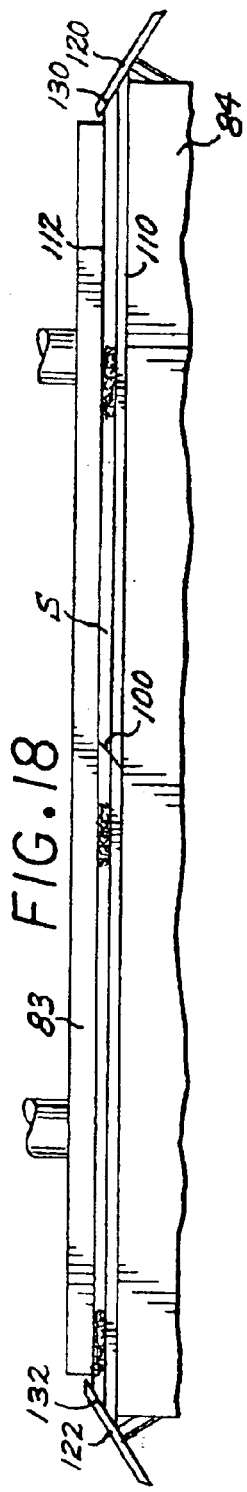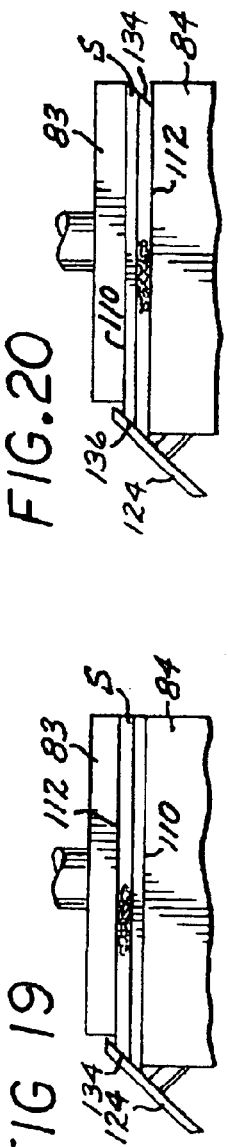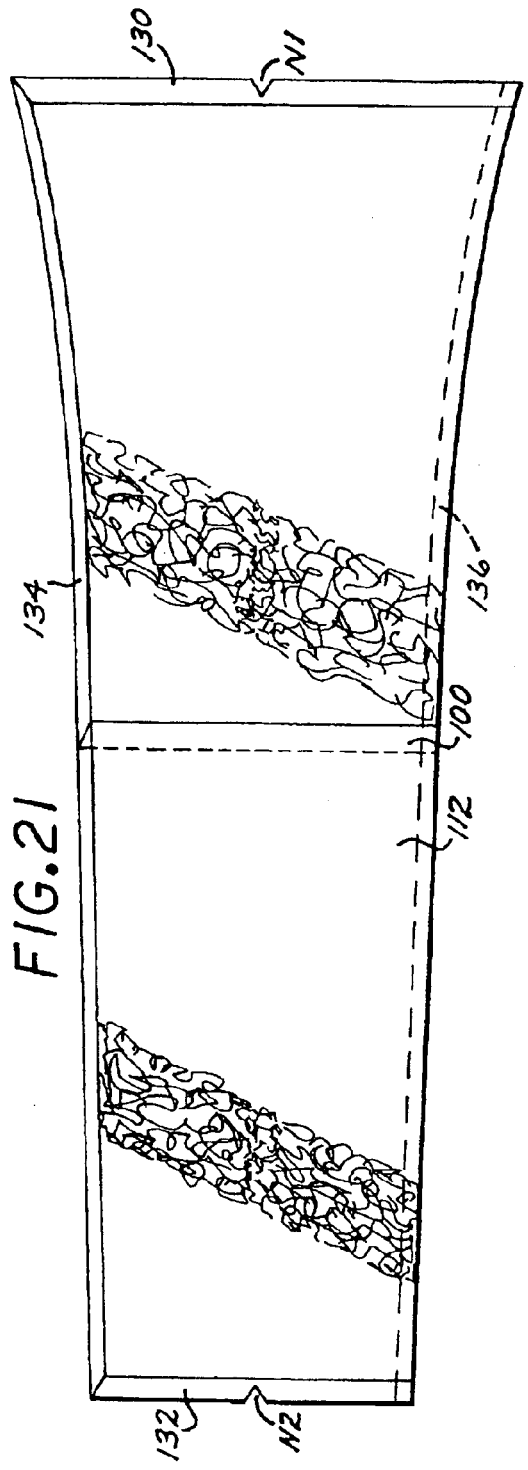

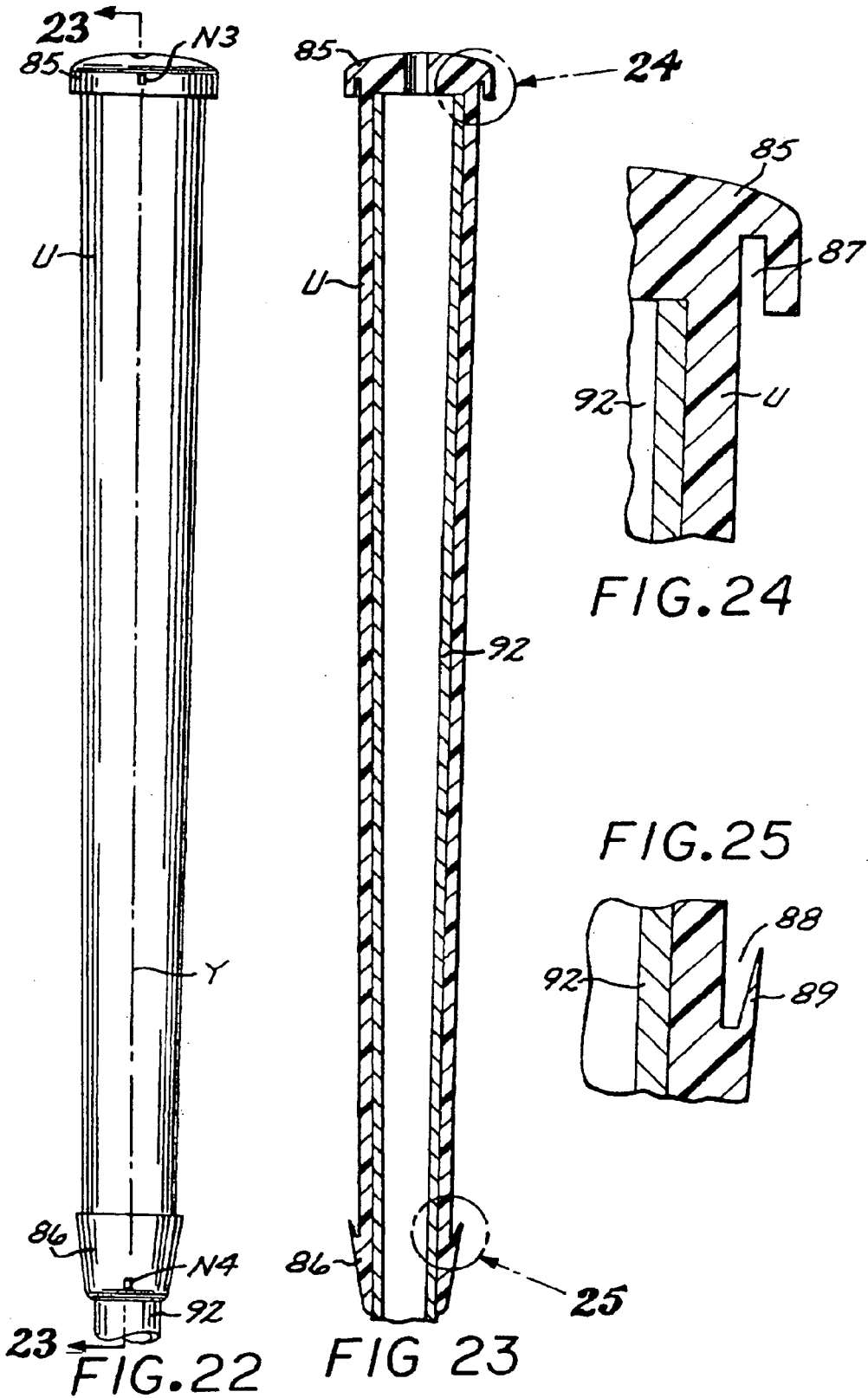

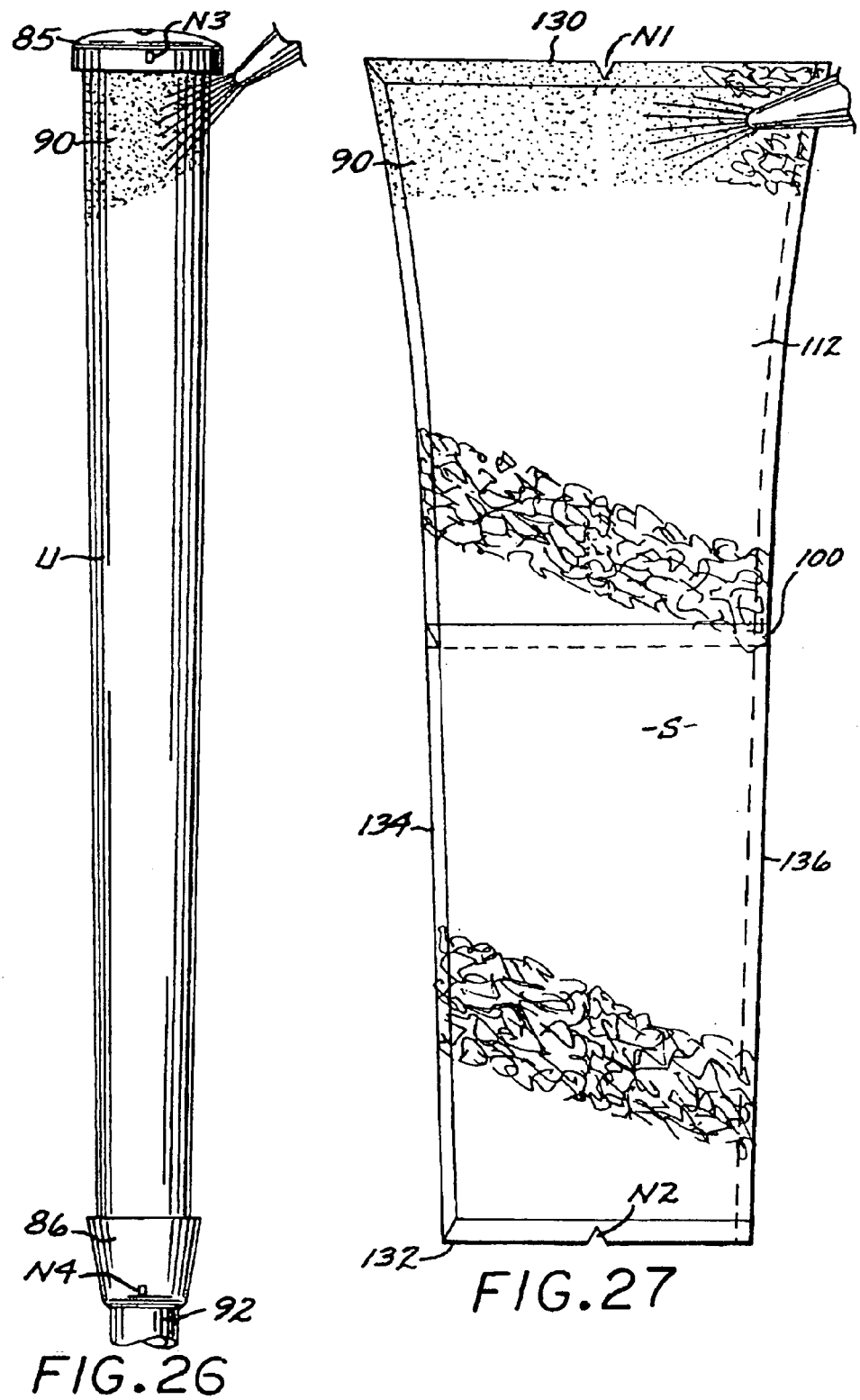

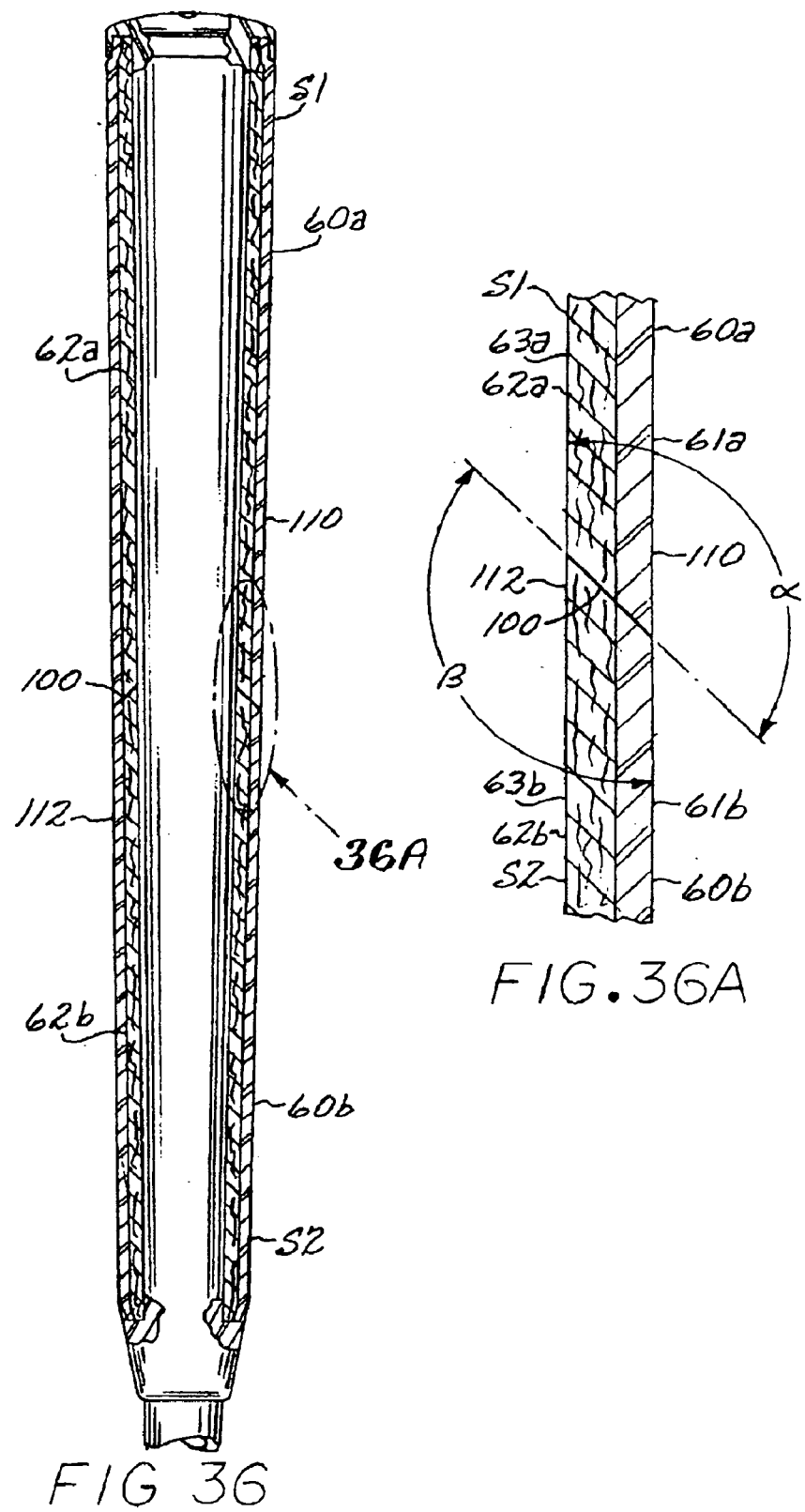

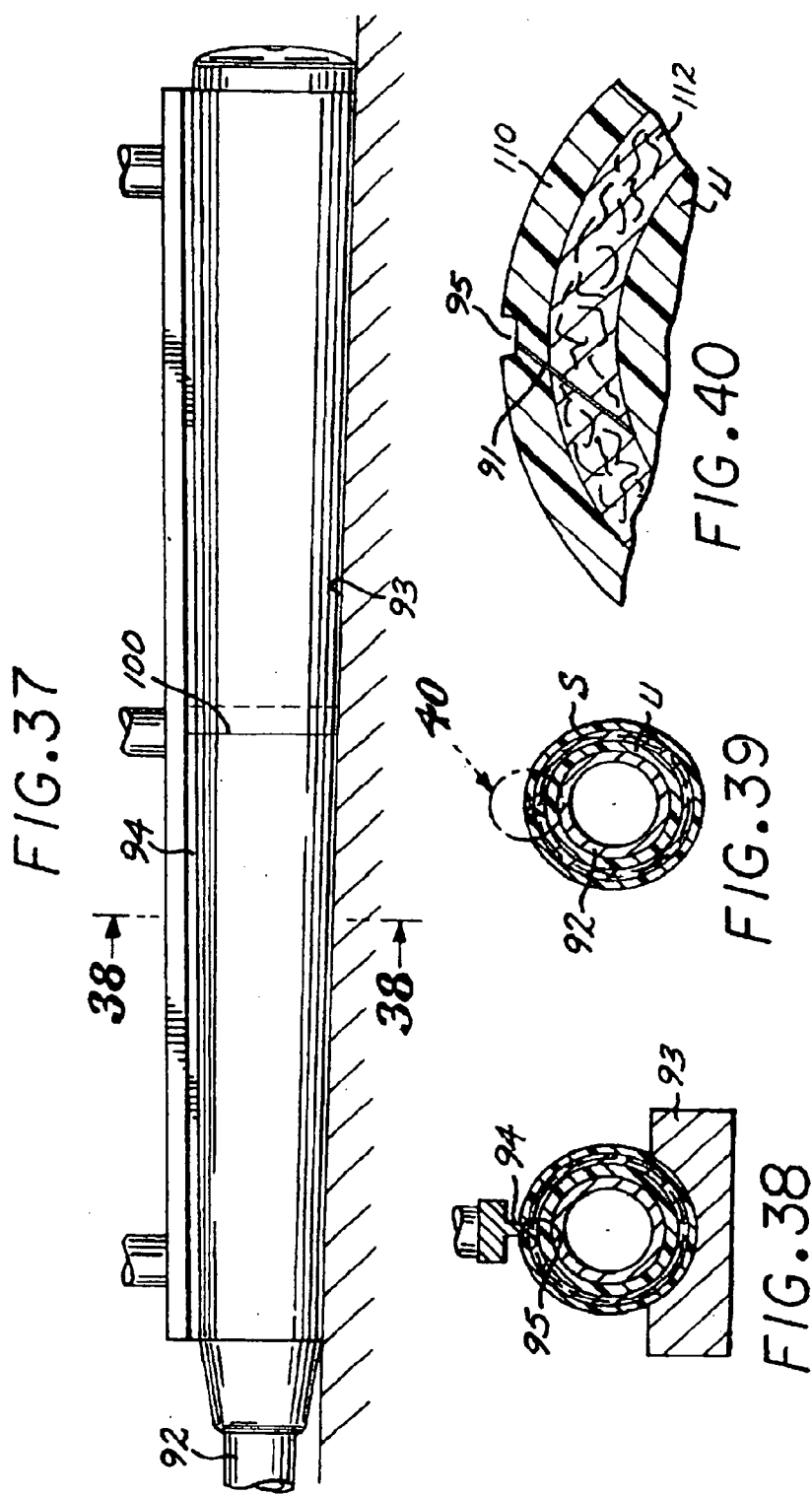

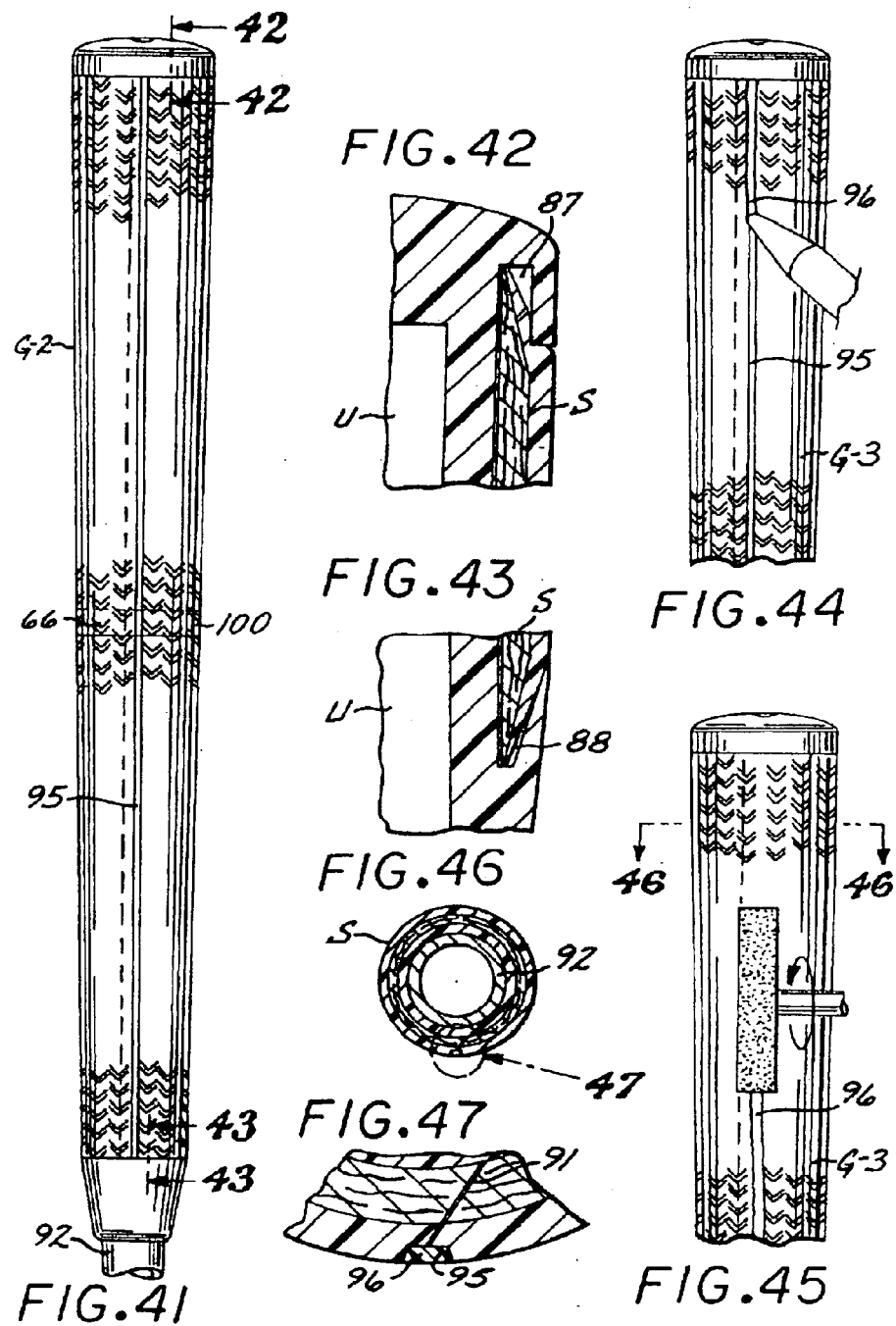

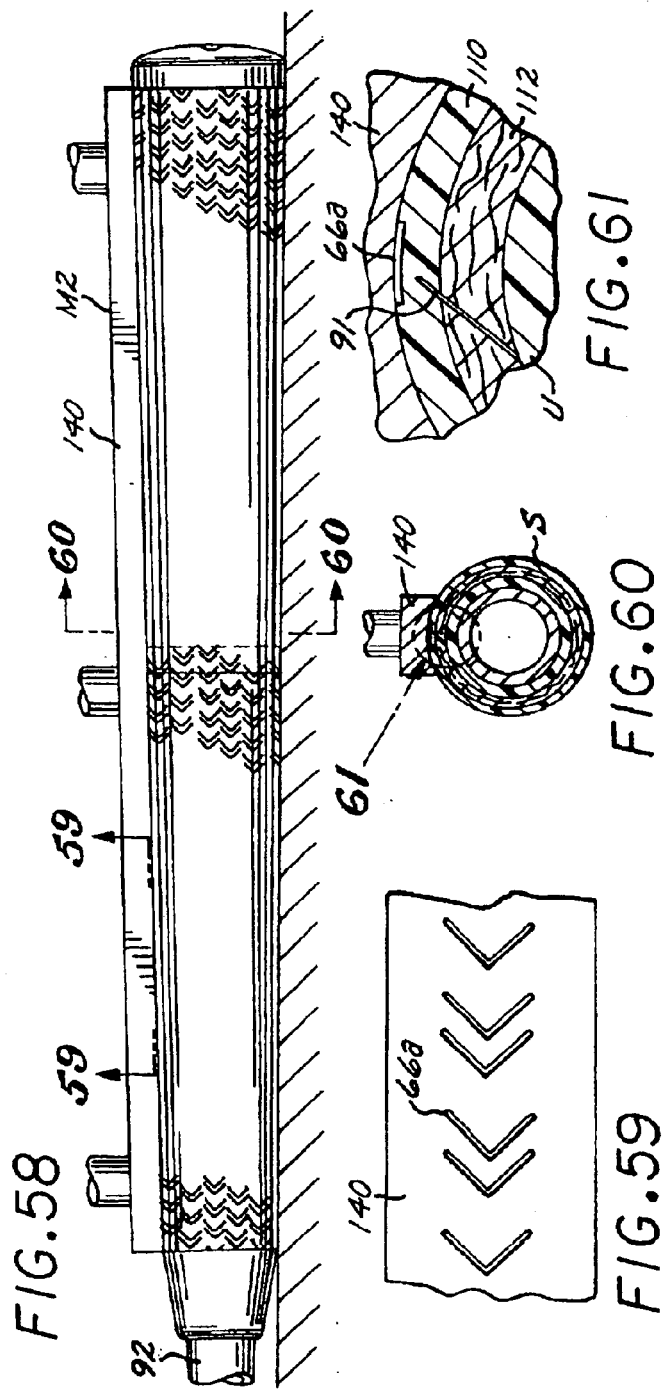

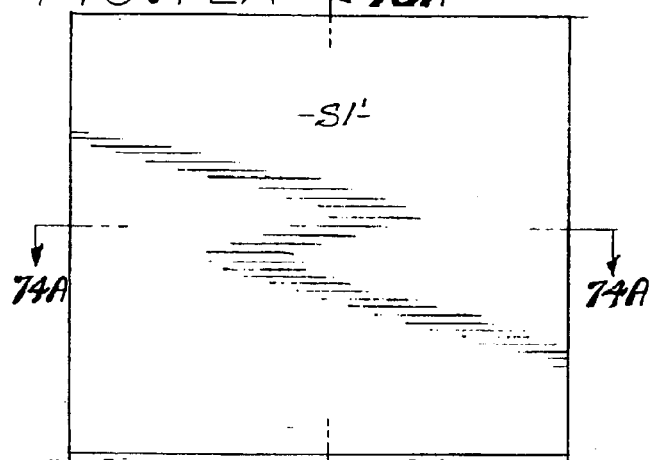
FIG.72A
FIG.72C
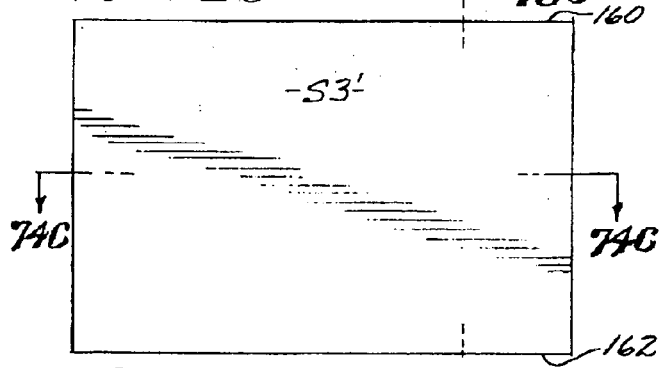
FIG.72B
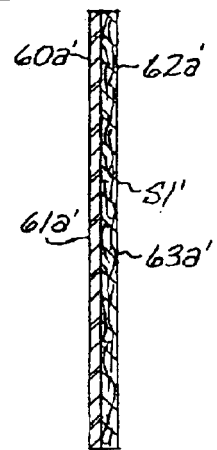
FIG.73A
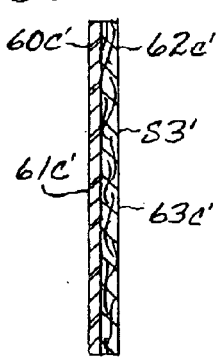
FIG.73C
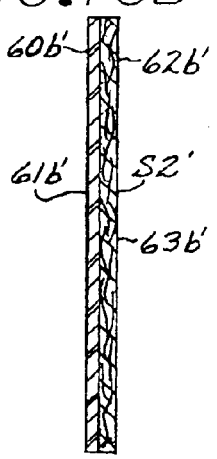
FIG.73B

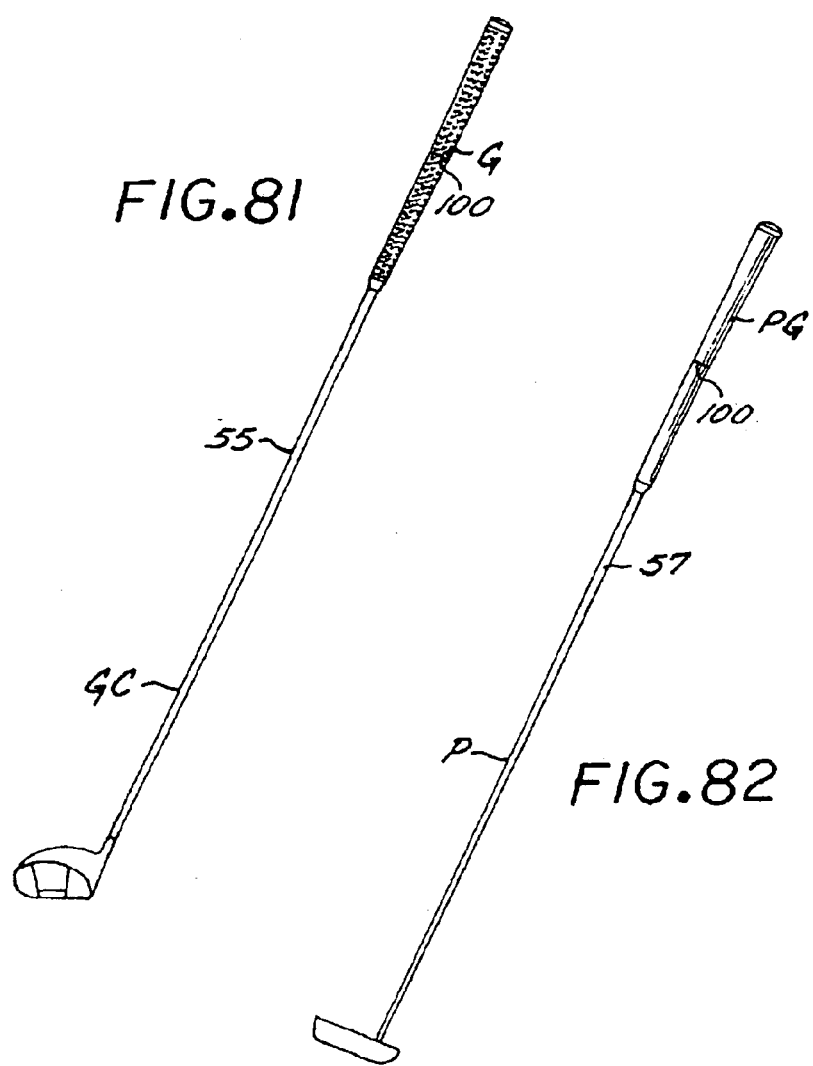

MULTI-SEGMENT SINGLE PANEL GRIP

BACKGROUND OF THE INVENTION

1. Field of the Invention

This application relates to an improved grip for golf clubs.

2. Description of the Related Art

Applicant has previously developed resilient grips which successfully reduce impact shock to the muscle and arm joints of the user's of golf clubs and also provide a feeling of tackiness between a player's hands and the grip. See, for example, U.S. Pat. No. 5,797,813 granted to Applicant on Aug. 25, 1998 and U.S. patent Application no. 10/392480 filed by Applicant on Mar. 18, 2003.

The earliest of these grips utilize a polyurethane-felt strip which is spirally wrapped around an underlisting sleeve that is slipped onto and adhered to a golf club handle. The sides of the strips are formed with overlapping heat depressed recessed reinforcement edges. While such grips have proven satisfactory in reducing impact shock, their fabrication is labor intensive, particularly since the strip must be wrapped manually about the underlisting sleeve within specific pressure parameters. Additionally, it is difficult to accurately align the adjoining side edges of the strip as such strip is being spirally wrapped about the underlisting sleeve. These wrapped grips can become twisted during the wrapping process, allow for only limited display of decorative designs and allow for only a limited placement of colors.

Applicant's Ser. No. 10/392,480 application seeks to overcome two of the aforementioned disadvantages of existing spirally wrapped grips while providing the same resistance to shock afforded by such grips, as well as providing tackiness. The disadvantages are eliminated by forming a structurally integral grip from a single polyurethane-felt panel having a configuration corresponding to the exterior shape of an underlisting sleeve. While this design removes the twisting problems associated with the wrapping process and offers more area to display decorative designs, it is limited in its ability to accommodate multiple color schemes which are so popular in today's modern world of golf.

SUMMARY OF THE INVENTION

Embodiments of the golf club grip of the present invention overcome the aforementioned disadvantages of the existing spirally wrapped grips and the single panel grips while providing the same resistance to shock afforded by such grips, as well as providing tackiness. Desirably, a structurally integral grip is formed from multiple, initially distinct, two-layer panels.

One preferred embodiment is a grip, including a preferably resilient underlisting sleeve, a first panel and a second panel. The first panel and the second panel are wrapped about and adhered to the underlisting sleeve. The underlisting sleeve has an opening at one end sized so that the sleeve is telescopically slippable onto the handle of a golf club. The underlisting sleeve also includes a cap with a downwardly facing circumferential slot and a nipple with an upwardly facing circumferential slot. The first panel includes a polyurethane outside layer bonded to a felt inside layer, a top edge, a bottom edge and two side edges extending between the top edge and the bottom edge, where the inside layer defines an inner surface of the first panel. The second panel includes a polyurethane outside layer bonded to a felt inside layer, a top edge, a bottom edge and two side edges extending between the top edge and the bottom edge, where the outside layer defines an outer surface of the second panel. The first panel of this embodiment defines a skived backside bottom edge having skiving extending from the inside layer to the outside layer so as to form an obtuse angle ($\alpha$ in FIG. 36A) with the inner surface of the first panel and the second panel defines a skived frontside top edge having skiving extending from the outside layer to the inside layer so as to form an obtuse angle ($\beta$ in FIG. 36A) with the outer surface of the second panel. The bottom edge of the first panel abuts the top edge of the second panel, so that the bottom edge of the first panel and the top edge of the second panel cooperate to form a substantially horizontal seam.

One embodiment is a grip, including a resilient underlisting sleeve, a first panel and a second panel. The first panel and the second panel are wrapped about and adhered to the underlisting sleeve. The underlisting sleeve has an opening at one end sized so that the sleeve is telescopically slippable onto the handle of a golf club. The first panel includes a polymeric outside layer bonded to a fabric inside layer, a top edge, a bottom edge and two side edges extending between the top edge and the bottom edge. The second panel includes a polymeric outside layer bonded to a fabric inside layer, a top edge, a bottom edge and two side edges extending between the top edge and the bottom edge. The first panel of this embodiment defines a skived bottom edge and the second panel defines a skived top edge. The bottom edge of the first panel abuts the top edge of the second panel, so that the bottom edge of the first panel and the top edge of the second panel cooperate to form a substantially horizontal seam.

Another embodiment is a grip, including an underlisting sleeve, a first panel and a second panel. The first panel and the second panel are wrapped about and adhered to the underlisting sleeve. The underlisting sleeve has an opening at one end sized so that the sleeve is telescopically slippable onto the handle of a golf club. The first panel includes a polymeric outside layer bonded to a fabric inside layer, a top edge, a bottom edge and two side edges extending between the top edge and the bottom edge. The second panel includes a polymeric outside layer bonded to a fabric inside layer, a top edge, a bottom edge and two side edges extending between the top edge and the bottom edge. The inside layer and the outside layer of the bottom edge of the first panel are skived. The inside layer and the outside layer of the top edge of the second panel are skived. The inside layer of the first panel abuts the inside layer of the second panel and the bottom edge of the first panel is secured to the top edge of the bottom panel. The bottom edge of the first panel and the top edge of the second panel cooperate to form a seam transverse to the longitudinal axis of the sleeve.

Yet another embodiment is a grip, including an underlisting sleeve, a first panel and a second panel. The first panel and the second panel are wrapped about and adhered to the underlisting sleeve. The underlisting sleeve has an opening at one end sized so that the sleeve is telescopically slippable onto the handle of a golf club. The first panel includes a polymeric outside layer bonded to a fabric inside layer, a top edge, a bottom edge and two side edges extending between the top edge and the bottom edge. The second panel includes a polymeric outside layer bonded to a fabric inside layer, a top edge, a bottom edge and two side edges extending between the top edge and the bottom edge. The inside layer and the outside layer of the bottom edge of the first panel are skived from the inside layer to the outside layer so as to form an obtuse angle with the inner surface of the first panel. The inside layer and the outside layer of the top edge of the second panel are skived from the outside layer to the inside layer so as to form an obtuse angle with the outer surface of the second panel. The bottom edge of the first panel abuts the top edge of the second panel. The bottom edge of the first panel and the top edge of the second panel cooperate to form a substantially horizontal seam.

Yet another embodiment is a method of making a grip for the handle of a golf club, including the following steps: providing an underlisting sleeve that is telescopically slippable onto the handle of a golf club; providing a first panel including a polymeric outside layer bonded to a fabric inside layer, the first panel having a top edge, a bottom edge and two side edges extending between the top edge and the bottom edge; providing a second panel including a polymeric outside layer bonded to a fabric inside layer, the second panel having a top edge, a bottom edge and two side edges extending between the top edge and the bottom edge; skiving the inside layer and the outside layer of the bottom edge of the first panel from the inside layer to the outside layer so as to form an obtuse angle with the inner surface of the first panel; skiving the inside layer and the outside layer of the top edge of the second panel from the outside layer to the inside layer so as to form an obtuse angle with the outer surface of the second panel; abutting the bottom edge of the first panel to the top edge of the second panel; wrapping the first panel about and adhering the first panel to the underlisting sleeve; wrapping the second panel about and adhering the second panel to the underlisting sleeve, whereby, upon completion of the securing step and the wrapping step, the bottom edge of the first panel and the top edge of the second panel cooperate to form a substantially horizontal seam.

Another embodiment is a grip, including an underlisting sleeve, a first panel, a second panel and a third panel. The first panel, the second panel and the third panel are wrapped about and adhered to the underlisting sleeve. The underlisting sleeve having a top end and a bottom end and being telescopically slippable onto the handle of a golf club. The first panel includes a polyurethane outside layer bonded to a felt inside layer, the first panel having a top edge, a bottom edge and two side edges extending between the top edge and the bottom edge. The second panel includes a polyurethane outside layer bonded to a felt inside layer, the second panel having a top edge, a bottom edge and two side edges extending between the top edge and the bottom edge. The third panel includes a polyurethane outside layer bonded to a felt inside layer, the third panel having a top edge, a bottom edge and two side edges extending between the top edge and the bottom edge. The top edge of the first panel is positioned adjacent the top end of the sleeve and the bottom edge of the second panel is positioned adjacent the bottom end of the sleeve. The first panel of this embodiment defines a skived backside bottom edge having skiving extending from the inside layer to the outside layer so as to form an obtuse angle ($\alpha'$ in FIG. 80A) with the inner surface of the first panel. The second panel of this embodiment defines a skived frontside top edge having skiving extending from the outside layer to the inside layer so as to form an obtuse angle ($\beta'$ in FIG. 80A) with the outer surface of the second panel. The third panel of this embodiment defines a skived frontside top edge having skiving extending from the outside layer to the inside layer so as to form an obtuse angle ($\gamma'$ in FIG. 80A) with the outer surface of the third panel and a skived backside bottom edge having skiving extending from the inside layer to the outside layer so as to form an obtuse angle ($\delta'$ in FIG. 80A) with the inner surface of the third panel. The bottom edge of the first panel abuts the top edge of the third panel so that the bottom edge of the first panel and the top edge of the third panel cooperate to form a substantially horizontal seam. The bottom edge of the third panel abuts the top edge of the second panel so that the bottom edge of the third panel and the top edge of the second panel cooperate to form a transverse and, preferably, substantially horizontal seam.

The inside layer is preferably a fabric layer, and more preferably a felt layer. The outside layer is preferably a polymer layer, and more preferably a polyurethane layer. In the case of a two-panel grip, the bottom edge of the first panel abuts the top edge of the second panel. These edges are desirably adhered together to define a generally horizontal seam. Two or more panels may be used to create a single, multi-segment, multi-colored panel grip. In grips with three or more panels, the top most and bottom most panels are desirably skived like the two-panel grip. The connecting panels are desirably skived with parallel edges such that their edges abut to define generally horizontal seams extending though the contiguous panel. The side edges of such multi-segment single panels desirably abut one another and are adhered together to define a longitudinal seam extending through the completed grip. A heat formed recessed sealing channel may be formed in the exterior portion of the polyurethane layer at the outer end of the seam to strengthen such seam. Hot polyurethane may be deposited along the seam or within the channel, after such polyurethane has hardened it may be buffed to smoothly blend into the surface of the grip. In another modification, a mold may be utilized to emboss a friction enhancing pattern over the deposited polyurethane to match any friction enhancing pattern pressed into the outside layer of the grip.

Embodiments of the present invention may be manufactured at considerably less cost than existing spirally wrapped grips since it eliminates the intensive labor of spirally wrapping a strip around an underlisting sleeve within specific pressure parameters. Additionally, embodiments of the multi-segment single panel grip will not twist either during manufacture or after it is adhered to an underlisting sleeve. My new grip desirably has an appearance similar to conventional molded rubber grips so as to appeal to professional golfers and low-handicap amateurs, and also provides a greater area for the application of decorative designs. Further, embodiments of the present invention can also accommodate multiple color combinations that would not have been possible with the single panel grips, thus appealing to golfers and college programs who wish to display their school colors while playing the sport they love. Embodiments of the present invention are very easy to install.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 1A is a front view of a first polyurethane-felt panel member of a multi-segment golf club grip;

FIG. 1B is a front view of a second polyurethane-felt panel member of a multi-segment golf club grip;

FIG. 2A is a vertical cross-sectional view taken along the line 2A—2A of FIG. 1A;

FIG. 2B is a vertical cross-sectional view taken along the line 2B—2B of FIG. 1B;

FIG. 7 is a front view of a multi-segment polyurethane-felt panel member of a golf club grip prior to being press cut to its working shape;

FIG. 8 is a vertical cross-sectional view showing the horizontal seam 100 taken along the line designated 8—8 in FIG. 7;

FIG. 9A is a front view of the multi-segment polyurethane-felt panel member after being press cut to its final working shape;

FIG. 9B is a side view of the multi-segment polyurethane-felt panel member of a golf club grip after being press cut to its final working shape;

FIG. 10 is a horizontal cross-sectional view showing a first mold which may be utilized in forming a multi-segment single panel grip;

FIG. 11A is a vertical cross-sectional view taken along line 11A—11A of FIG. 10;

FIG. 11B is a vertical cross-sectional view of an alternative mold which may be utilized in forming a multi-segment single panel grip from a view corresponding to the view taken along line 11A—11A of FIG. 10;

FIG. 12A is an enlarged view of the encircled area designated 12A in FIG. 11B;

FIG. 12B is an enlarged view of the encircled area designated 12B in FIG. 11B;

FIG. 13 is an enlarged view of the encircled area designated 13 in FIG. 10;

FIG. 14 is a front view of the multi-segment single panel of FIG. 9 after it is removed from the mold shown in FIG. 10;

FIG. 15 is a front view of the multi-segment single panel of FIG. 9 after it is removed from another version of the mold shown in FIG. 10;

FIG. 18 shows the top and bottom edges of the multi-segment single panel being skived;

FIG. 19 shows a first side edge of the multi-segment single panel being skived;

FIG. 20 shows a second side edge of the multi-segment single panel being skived;

FIG. 21 shows the interior surface of the multi-segment single panel after the top, bottom and side edges thereof have been skived in the manner depicted in FIGS. 18, 19, and 20;

FIG. 22 is a front view of an underlisting sleeve member of the multi-segment single panel grip of the present invention;

FIG. 23 is a vertical cross-sectional taken along the line 23—23 of FIG. 22;

FIG. 24 is an enlarged view of the encircled area designated 24 in FIG. 23;

FIG. 25 is an enlarged view of the encircled area designated 25 in FIG. 23;

FIG. 26 is a front view showing adhesive being applied to the exterior of the underlisting sleeve;

FIG. 27 is a front view showing adhesive being applied to the interior surface of the multi-segment single panel;

FIG. 36 is a vertical cross-sectional view taken along line 36—36 of FIG. 30;

FIG. 36A is an enlarged view of the encircled area designated 36A in FIG. 36;

FIG. 37 is a side view showing a heat depressed sealing channel being formed along the top portion of the seam shown in FIG. 35;

FIG. 38 is a vertical cross-sectional view taken along line 38—38 in FIG. 37;

FIG. 39 shows the parts of FIG. 38 after the sealing channel has been formed;

FIG. 40 is an enlarged view of the encircled area designated 40 in FIG. 39;

FIG. 41 is a front view of a completed multi-segment single panel grip according to an embodiment of the present invention;

FIG. 42 is a vertical cross-sectional view taken along the line designated 42—42 of FIG. 41;

FIG. 43 is a vertical cross-sectional view taken along the line designated 43—43 of FIG. 41;

FIG. 44 is a broken front view showing a first step in making a modification of the grip of FIG. 39;

FIG. 45 is a broken front view showing a second step in making a modification of the grip of FIG. 39;

FIG. 46 is a horizontal cross-sectional view taken along line 46—46 of FIG. 45;

FIG. 47 is an enlarged view of the encircled area designated 47 in FIG. 46;

FIG. 58 is a side view of a die utilized in modifying the grips of FIGS. 52 and 55;

FIG. 59 is a horizontal cross-sectional view taken along line 59—59 in FIG. 58;

FIG. 60 is a vertical cross-sectional view taken along line 60—60 of FIG. 58;

FIG. 61 is an enlarged view of the encircled area designated 61 of FIG. 58;

FIG. 62 is a front view of a grip made in accordance with FIGS. 58–61;

FIG. 72A is a front view of a top polyurethane-felt panel member S1' of a multi-segment golf club grip;

FIG. 72B is a front view of a middle polyurethane-felt panel member S2' of a multi-segment golf club grip;

FIG. 72C is a front view of a bottom polyurethane-felt panel member S3' of a multi-segment golf club grip;

FIG. 73A is vertical cross-sectional view taken along the line 73A—73A of FIG. 72A;

FIG. 73B is vertical cross-sectional view taken along the line 73B—73B of FIG. 72B;

FIG. 73C is vertical cross-sectional view taken along the line 73C—73C of FIG. 72C;

FIG. 81 is a perspective view of a golf club provided with a multi-segment single panel grip according to an embodiment of the present invention;

FIG. 82 is a perspective view showing a putter provided with a multi-segment single panel grip according to an embodiment of the present invention.

Figure 3A:
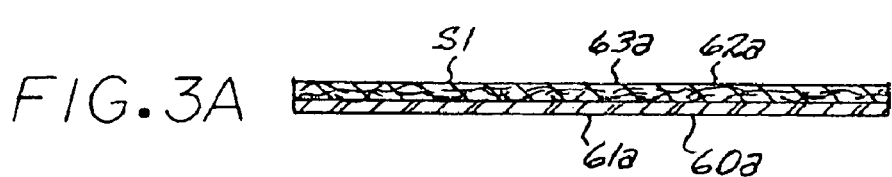
FIG. 3A is a horizontal cross-sectional view taken along line 3A—3A of FIG. 1A.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

Referring to the drawings, in FIG. 81, a multi-segment single panel grip G embodying the present invention is shown attached to the shaft 55 of a golf club GC. In FIG. 82, a multi-segment single panel putter grip PG is shown attached to the shaft 57 of a putter P. Referring now to the remaining drawings, a preferred form of grip G includes a multi-segment single panel S formed of multiple panels of bonded-together layers of polyurethane 60 and a felt 62 which is then wrapped about and adhered to a resilient underlisting sleeve U of conventional construction. Throughout the application, the term top is used to refer to that which is closest to the butt end of the club opposite the club head, i.e. the end closest to the golfer if that golfer were to be swinging or stroking the club. Similarly, the term bottom is used to define the panel or edge furthest from the butt end of the club.

FIG. 1A shows a first two-layer panel S1 with an outside layer 60a and an inside layer 62a (FIG. 2A). FIG. 1B shows a second two-layer panel S2 that will abut against and be bonded to the first panel S1 to form a multi-segment single panel MP (FIG. 7). In particular, the first panel S1 has a bottom edge 81 that, after processing, will abut against a top edge 82 of the second panel S2. It is understood that the panels used to form any particular grip will be constructed generally the same, differing principally in their color and size.

The outside layer of the panels in this disclosure is generally referred to as a polyurethane layer. Though polyurethane is the preferred material, other materials could be used and achieve some advantages. In particular, other polymeric compounds can be used to create the outer layer and achieve some advantages. Similarly, the inside layer is generally referred to as felt in this disclosure. Though felt is preferred, it is understood that other fabric layers can be used in alternative embodiments of this invention. Polyurethane and felt are used throughout as a matter of convenience. In another embodiment, the inside layer may comprise a polymer, more preferably ethylene vinyl acetate (EVA).

Figure 3B:
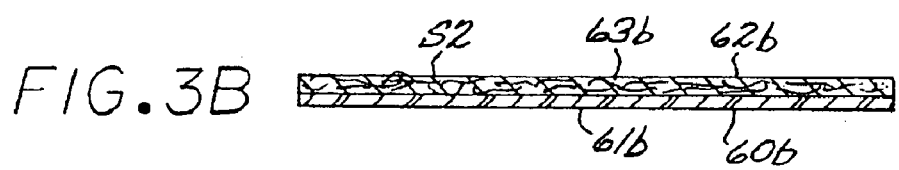
FIG. 3B is a horizontal cross-sectional view taken along line 3B—3B of FIG. 1B.

Referring to FIGS. 1, 2 and 3, the felt layers 62a, 62b have their outer surfaces bonded to the inner surface of the polyurethane layers 60a, 60b, with such polyurethane layers 60a, 60b preferably being coagulated to define pores (not shown). Once bonded, the outside layer 60a of the first panel S1 has an outer surface 61a, while the inside layer 62a has an inner surface 63a. As will be appreciated by those of skill in the art, the outer surface 61a of the outside layer 60a defines the outer surface of the first panel S1 and the inner surface of 63a of the inside layer 62a defines the inner surface of the first panel S1. Similarly, the outside layer 60b of the second panel S2 has an outer surface 61b, while the inside layer 62b has an inner surface 63b. Thus, the outer surface 61b of the outside layer 60b defines the outer surface of the second panel S2 and the inner surface 63b of the inside layer 62b defines the inner surface of the second panel S2 (FIG. 8). The felt layer may be fabricated of wool, polyester, nylon or mixtures thereof. Preferably, a nylon polyester felt will be utilized. The polyurethane layers 60a, 60b may be formed in a conventional manner by coating one side of a felt strip with a solution of polyurethane (e.g., polyester, polyether) dissolved in dimethyl formamide (DMF), immersing the coated strip in water baths to displace the DMF and cause the urethanes to coagulate, and finally, driving off the water by the application of pressure and heat. The solids content of the polyurethane layer will vary in accordance with the desired hardness of such polyurethane layer. A preferred solids content solution is approximately 28.5–30.5%, with a viscosity range of about 60,000–90,000 cps measured at 25+/−0.5 degrees C. Suitable polyurethane ingredients can be purchased from the following companies:

Lidye Chemical Co., Ltd.
10F1 Lidye-Commercial Bldg.
22 Nanking W. Road, Taipei
Taiwan, R.O.C.
Lidye Chemical Co., Ltd.
No. 17, Ching Chien 6$^{th}$ Road
Guan in Industrial Area, Guan In Shiang
Taoyuan Hsien, Taiwan, R.O.C.
Lidye Resin (Panyu) Co., Ltd.
Xiadao Industrial Park
Liye Road, Dongchong Town
Panyu City, Guangdong Province, PRC Preferably, the thickness of the polyurethane layer will be about 0.3–0.5 millimeters and the thickness of the felt layer about 0.8–1.7 millimeters. The polyurethane layer of the panels provides a cushioned grasping surface for a golfer's hands on a golf club and also enhances the golfer's grip by providing increased tackiness between the player's hand and the grip. In each panel, the felt layer provides strength to the polyurethane layer and serves as a means for attaching the bonded-together polyurethane and felt multi-segment single panel to an underlisting sleeve U.

Figure 4:
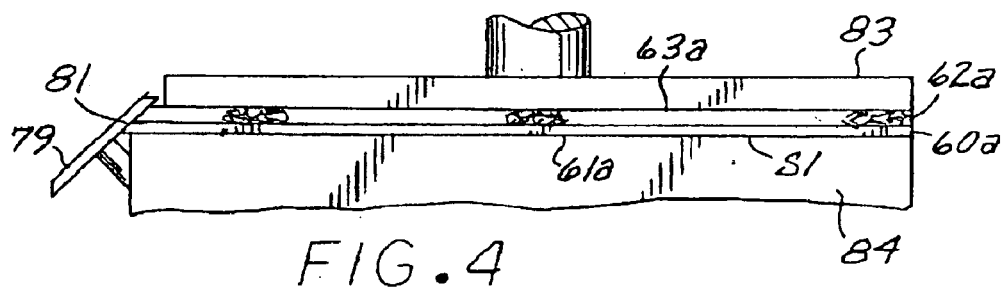
FIG. 4 shows the bottom edge of the first panel member S1 of FIG. 1A being skived.
Figure 5:
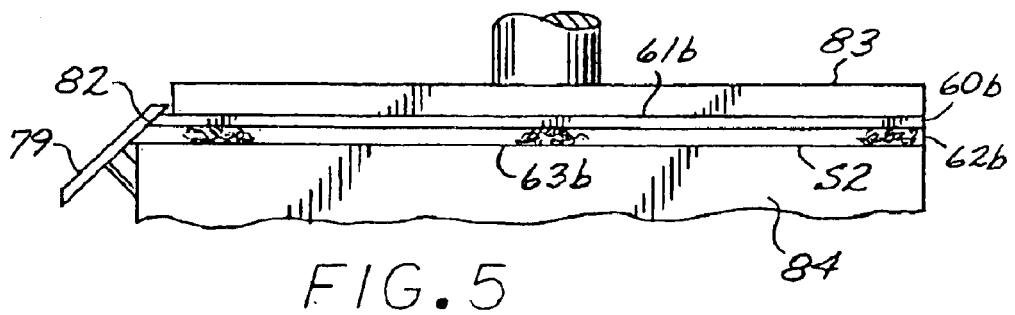
FIG. 5 shows the top edge of the second panel member S2 of FIG. 1B being skived.

The multiple panels that will form the basis of the multi-segment single panel MP are desirably prepared. Referring now to FIG. 4, the first panel S1 is shown having its bottom edge 81 skived by a single rotating knife 79 downwardly and outwardly from the inside layer 62a to the outside layer 60a, thereby creating skived edge 81. The first panel S1 is placed felt or inside layer 62a up and a pressure plate 83 is utilized to secure the panel S1 on a base 84 during the skiving operation. Preferably, the skived edge 81 will have a width of about 4.0–6.0 millimeters. In FIG. 5, the second panel S2 is, shown secured to base 84 felt side 62b down while the rotating knife 50 skives its top edge 82 from the outside layer 60b to the inside layer 62b to form skived edge 82.

Figure 6B:
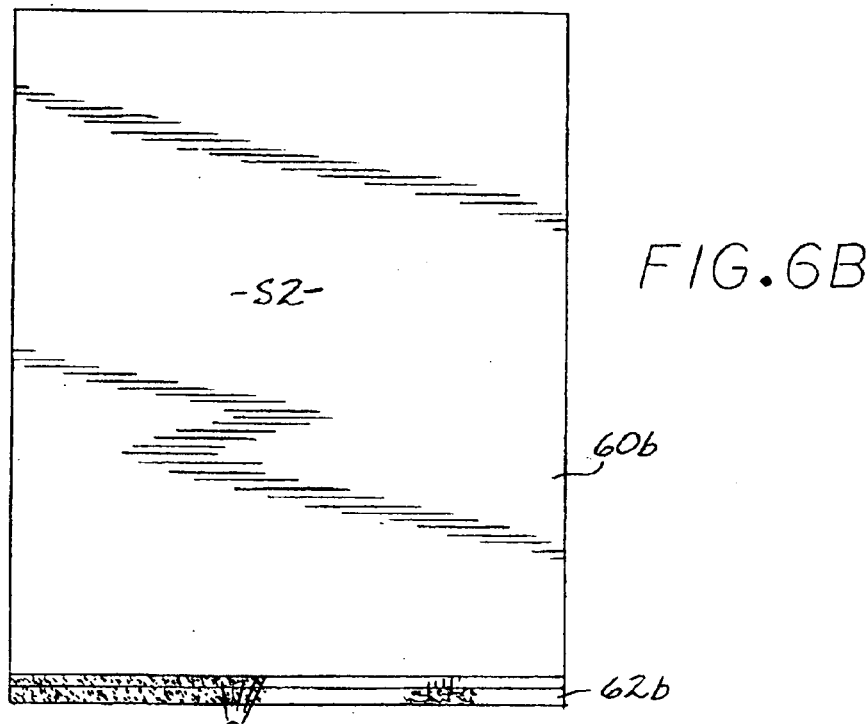
FIG. 6B is a front view showing adhesive being applied to the skived top edge of the second panel member S2.
Figure 6A:
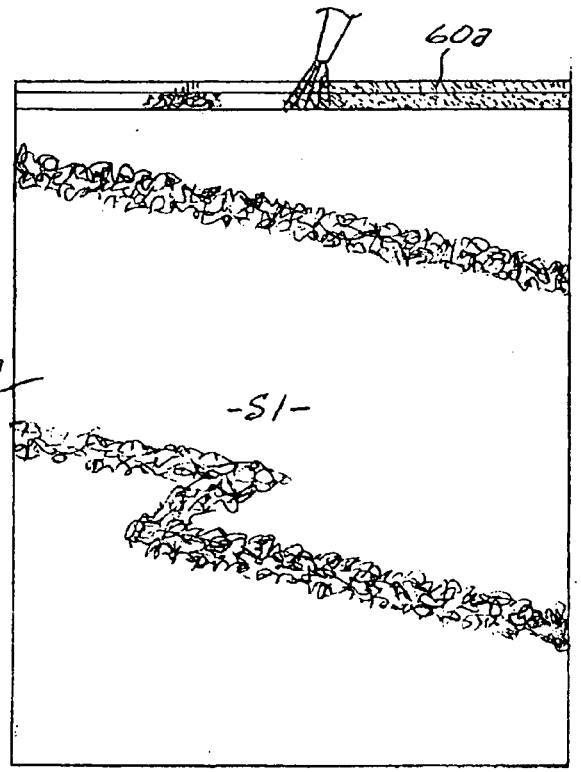
FIG. 6A is a rear view showing adhesive being applied to the skived bottom edge of the first panel member S1.

FIG. 6A shows the application of an adhesive 90 by means of a nozzle, brush or the like to the skived edge 81 of the first panel S1. Similarly, FIG. 6B shows the application of an adhesive 90 by means of a nozzle, brush or the like to the skived top edge 82 of the second segment S2.

After application of the adhesive 90, the skived edges 81, 82 abut and are pressed together such that the once separate polyurethane-felt panels S1, S2 now form a contiguous multi-segment panel MP with a substantially horizontal seam 100, as shown in FIG. 7.

FIG. 8 is a horizontal sectional view taken along the line designated 8—8 in FIG. 7. Note the felt—felt bond between the felt layer 62a of the first panel S1 and the felt layer 62b of the second panel S2. This felt—felt bonding section adds structural integrity to the panel MP.

The preferred method is to skive the bottom edge 81 of the first panel S1 downwardly and outwardly from its inside layer 62a to its outside layer 60a (FIG. 4) while skiving the top edge 82 of the second panel S2 in a similar manner (FIG. 5), noting that the second panel S2 is secured outside layer 60b facing up towards the pressure plate 83, where as the first panel S1 is skived with its inside layer 62a facing up towards the pressure plate 83. Desirably, the outer surface 61b of the second panel S2 and the skived top edge 82 of the second panel S2 form an included obtuse angle, more preferably an included obtuse angle of over 110 degrees, more preferably an included obtuse angle of roughly 130–160 degrees and, most preferably, an included obtuse angle of roughly 135 degrees. The inner surface 63a of the first panel S1 and the skived bottom edge 81 of the first panel S1 desirably form a similar included obtuse angle to the angle formed by the outer surface 61b of the second panel S2 and the skived top edge 82 of the second panel S2.

While there are other ways to practice the invention, this structure is preferred for several reasons. One common tendency of golfers is to stroke downwardly with their thumbs as they prepare to hit the ball. This could place pressure on the horizontal seam. Our preferred configuration allows this downward stroking without encouraging the panels to separate from the underlisting sleeve. That is, the thin uppermost portion of the top edge 82 is protected from rolling downward by the overlapping bottom edge 810f the first panel. Significantly, this thin felt uppermost portion of the top edge 82 of the second panel S2 is glued to the structurally strong felt portion of the bottom edge 81 of the first panel S1. The grip G would be much less effective at preventing premature unraveling if it had an exposed thin upward facing edge. The only thin upward facing portion of the edge at the seam 100, the thin uppermost portion of the top edge 82 of the second panel S2, is safely enclosed on the inside of the grip G and securely attached to the underlisting sleeve U. While the outside of the grip G is exposed by definition, the portion of the seam 100 that is exposed is the lowermost portion of the bottom edge 81 of the first panel S1. This lowermost portion of the bottom edge 81 is downward facing and thus naturally allows the thumb to roll over it without encouraging premature unraveling. Even if the two panels were somewhat misaligned, so that a portion of the upwardly facing edge of the top edge on the second panel S2 were exposed, the exposed portion would be almost as thick as the body of the panel and, thus, structurally strong. Importantly, the large obtuse angle formed by the top edge of the second panel and the outer surface of the first panel would tend to guide the user's thumb outward and downward, away from the thin uppermost portion of the top edge of the second panel S2. As such, this preferred configuration discourages unraveling, even in the event of misalignment.

Further, it is less distracting for the golfer looking down at the handle when the seam is fluid, another advantageous result of our horizontal seam with the preferred skiving because the outer layer of the top panel flows over the lower panel. Regardless, the skiving is performed such that the polyurethane side 60a of the first panel S1 and the polyurethane side 60b of the second panel S2 are on the same side of the contiguous multi-segment panel MP to form a contiguous polyurethane outside layer 110 (FIG. 7). Once each panel has its respective skived edge, the segments are ready to be bonded.

Once the panels are joined, the panel MP is press cut in the conventional way to form the shaped panel S found in FIG. 9A. The same press cut also forms notches N1, N2 in the panel S at the center of the top and bottom edges, respectively. The notches N1; N2 serve as markings to help center the panel on the underlisting sleeve U. Though there are other methods of centering the panel, these notches are preferred because they reduce cost and do not affect the contours of the finished grip G. By way of example, it is possible to have a raised or scored line running vertically along the underlisting G to indicate the central axis. This line could then correspond to a scored line on the panel grip, thus providing a means for centering the panel on the grip. However, because the lines on both the panel and the underlisting involve adding to or taking away from the respective piece, the lines have the potential of affecting the contours of the grip surface. The notches, on the other hand, reside under the cap and nipple (discussed below) and thus do not affect the contours of the grip.

FIG. 9B shows an edge view of shaped panel S. Note the horizontal seam 100 and dual contiguous layers 110, 112 running the length of the panel S.

Referring now to FIGS. 10–17 there is shown a first mold M which is utilized to form a friction enhancing pattern 66 (FIG. 14) on the polyurethane layer 110. Mold M includes a base plate B and a heated platen 67 formed with a cavity 68. The platen 67 is provided with depending protrusions 69 that engage the outer surface of the polyurethane layer 110 so as to form the depressed friction enhancing pattern 66, as seen in FIG. 13. The heated platen 67 may include depending protrusions 69a that would form recessed side edges 70, 71 on edges 134, 136, respectively, and recessed top and bottom edges (not shown) on top and bottom edges 130, 132 on the polyurethane layer 110, as shown in FIGS. 11b, 12a and 12b. Alternatively, the preferred embodiment contains no such side oriented protrusions 69a such that use of the mold M results only in the friction enhancing pattern 63 on the polyurethane layer 110, as demonstrated by FIGS. 11a and FIG. 14.

Figure 16:
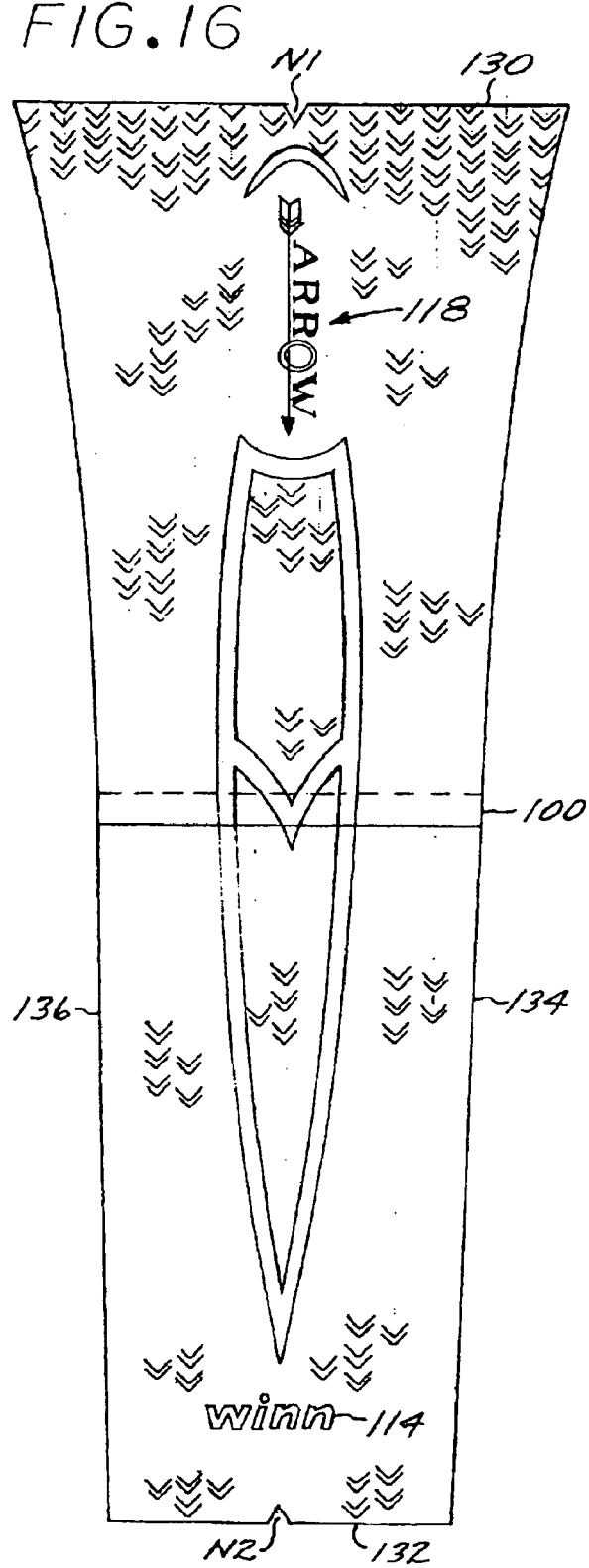
FIG. 16 is a front view of the multi-segment single panel of FIG. 9 after it is removed from yet another version of the mold shown in FIG. 10.

In alternative embodiments, other patterns may be formed on the polyurethane layer 110. As seen in FIG. 15, one alternative design leaves the majority of the outside layer 110 smooth while visual indicia, such as a logo 116 is placed near the bottom end of the panel S. In FIG. 16, yet another embodiment of the friction enhancing pattern is shown. The second pattern 118 incorporates visual indicia extending the majority of the length of the panel surrounded by a tread pattern similar to the friction enhancing pattern 66 in FIG. 13. FIG. 16 also shows an alternative means for imputing decorative designs or logos on the grip panel S. Stamped visual indicia, such as logo 114, is ink stamped onto the polyurethane layer 10 using a suitable ink known to those of skill in the art. Preferably, the ink is waterproof and heat resistant and, more preferably, formulated to resist degradation when coming into contact with the lubrication fluid or solvent used to apply the completed grip G (underlisting U with panel S) over the end of a golf club GC shaft 55 (FIG. 81) or a putter P shaft 57 (FIG. 82). It is to be understood that these are representative and many other patterns and stamps may be used with this multi-segment single panel grip.

Figure 17:
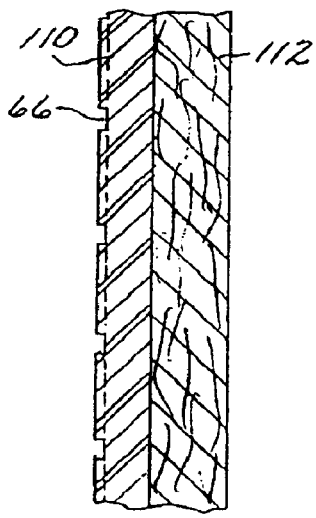
FIG. 17 is a vertical cross-sectional view taken along line 17—17 of FIG. 15.

FIG. 17 is a cross-sectional view taken along the line designated 17—17 in FIG. 14. It shows the friction enhancing pattern 66 formed on the contiguous polyurethane layer 110.

Referring now to FIGS. 18–21, the peripheral edges of the panel S are shown being skived by a pair of rotating knives 120, 122 which engage the top and bottom edges 130,132 of the panel S (FIG. 18), and a single rotating knife 124 (FIG. 19) engaging side edges 134, 136. Knives 120 and 122 form top and bottom skived edges 130, 132, respectively. Knife 124 is shown forming skived edge 134 on one side of the panel S in FIG. 19 and the skived edge 136 in FIG. 20 after the first side has been skived. A pressure plate 83 is utilized to secure the panels on base 84 during the skiving operation. It will be noted that the skiving on the opposite sides of the panel S are parallel to one another, as seen in FIG. 20. Preferably, the skiving will have a width of about 4.0–6.0 millimeters.

FIG. 21 is a rear view of the panel S after the rotating knives 120, 122, 124 have skived the edges 130, 132, 134, 136.

Referring now to FIGS. 22–25 there is shown an underlisting sleeve U formed of a resilient material such as a natural or synthetic rubber or plastic. Sleeve U includes an integral cap 85 at its top end, while the bottom end of the sleeve is formed with an integral nipple 86. The underside of the cap is formed with a downwardly extending slot 87. Preferably, the slot 87 wraps circumferentially around the underlisting U. The slot 87 receives the top skived edge 130 of the panel S as described hereinafter. Similarly, the integral nipple 86 of the underlisting U is formed with an upwardly extending slot 88. The slot 88 is preferably circumferentially wrapped about the underlisting U. Preferably, underlisting sleeve U will be formed with centering notches N3, N4 indicating a middle point for application of the completed grip panel S to the underlisting sleeve U to form complete grip G.

Referring now to FIGS. 26–35 the panel S is shown being applied to an underlisting sleeve U. In FIG. 26, the exterior surface of the underlisting sleeve U is shown receiving an adhesive 90 by means of a nozzle, brush or the like. In FIG. 27, the inner surface of the contiguous felt layer 112 is shown receiving an adhesive 90 by means of a nozzle, brush or the like.

Figures 28, 29:
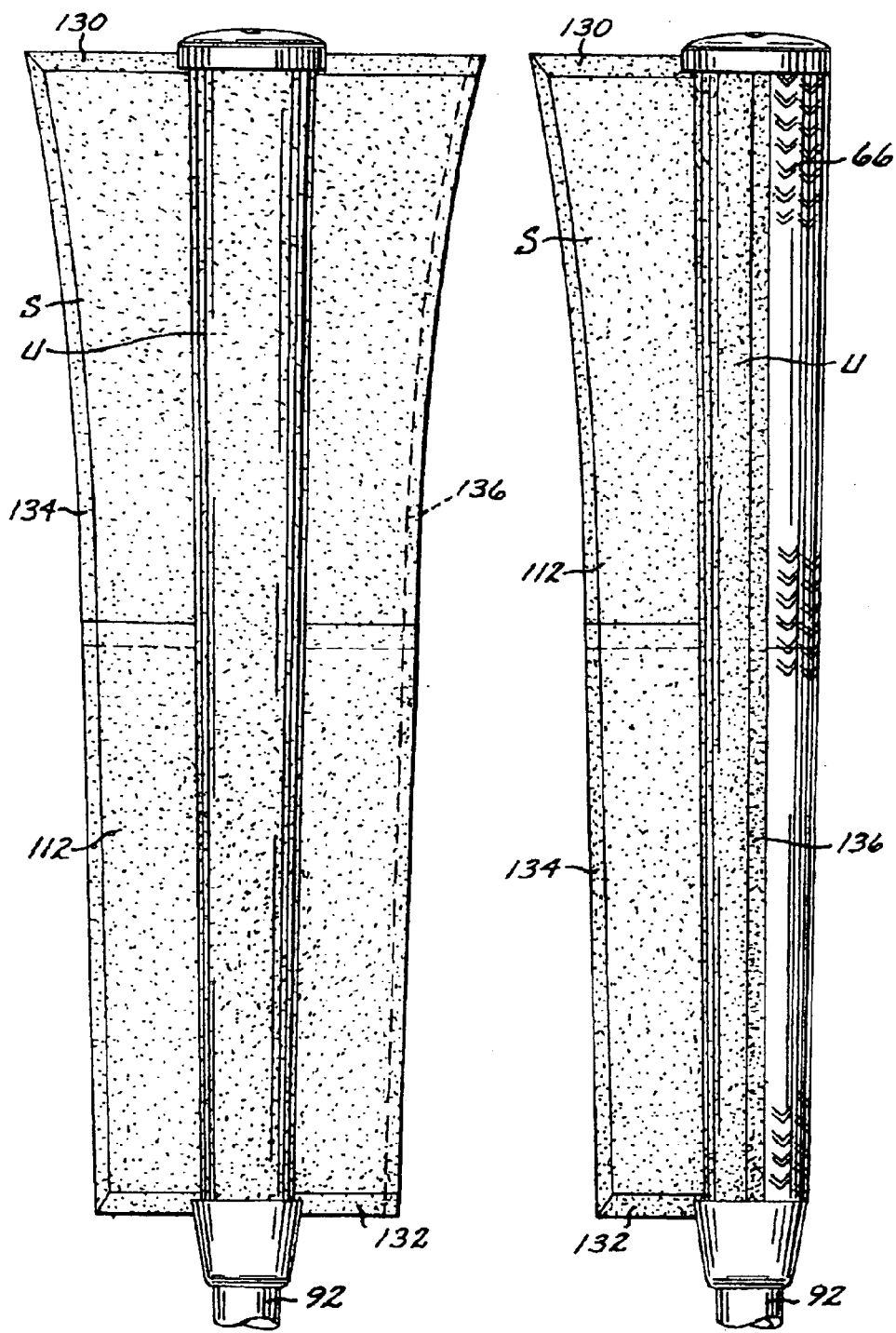
FIG. 28 is a front view showing a first step in wrapping and adhering the the multi-segment single panel to an underlisting sleeve.
FIG. 29 is a front view showing a second step in wrapping and adhering the multi-segment single panel around an underlisting sleeve.

FIG. 28 shows the panel S being wrapped around and adhered to the underlisting sleeve U. During this operation, the notches N1, N2 of the panel S are disposed in alignment notches under notches N3, N4 of the underlisting sleeve U. Also, the top edge 130 of the panel S will be manually inserted within the slot 87 of the underlisting cap 85, while the bottom edge 132 of the panel S is manually inserted within the slot 88 formed within the nipple 86 by temporarily flexing the peripheral lip 89 outwardly.

Figure 33:
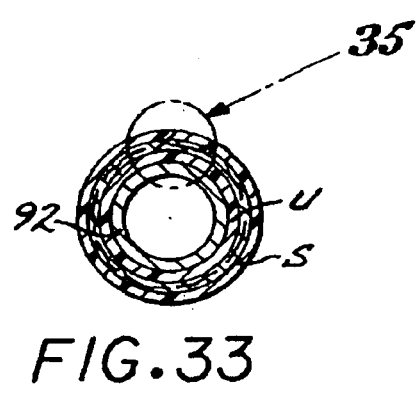
FIG. 33 is a horizontal cross-sectional view taken along line 33—33 of FIG. 30.
Figure 34:
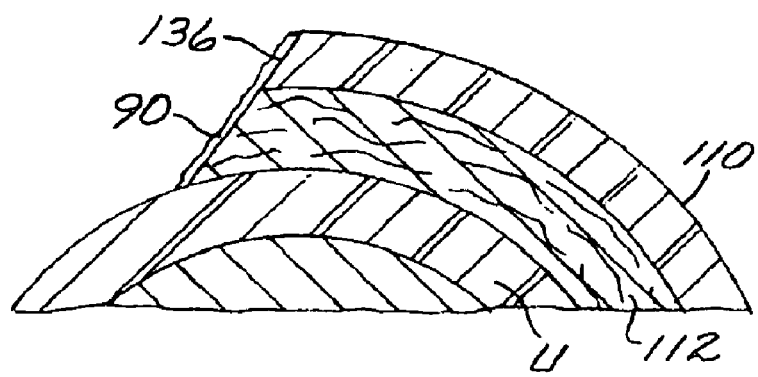
FIG. 34 is an enlarged view of the encircled area designated 34 in FIG. 32.
Figure 35:
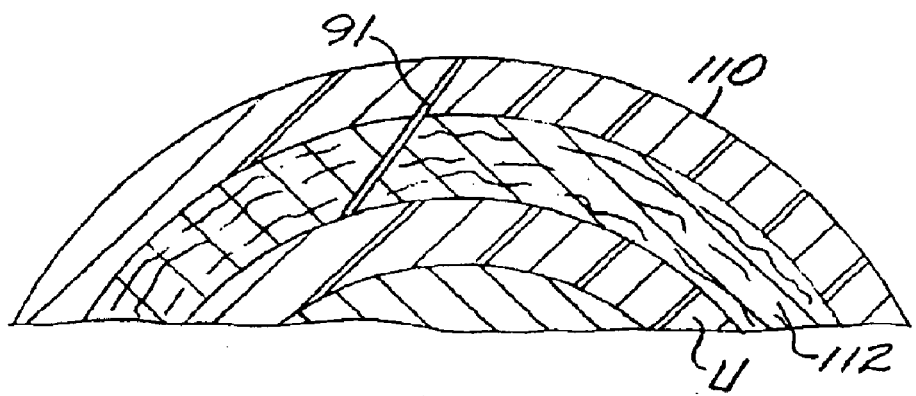
FIG. 35 is an enlarged view of the encircled area designated 34 in FIG. 33.
Figure 48:
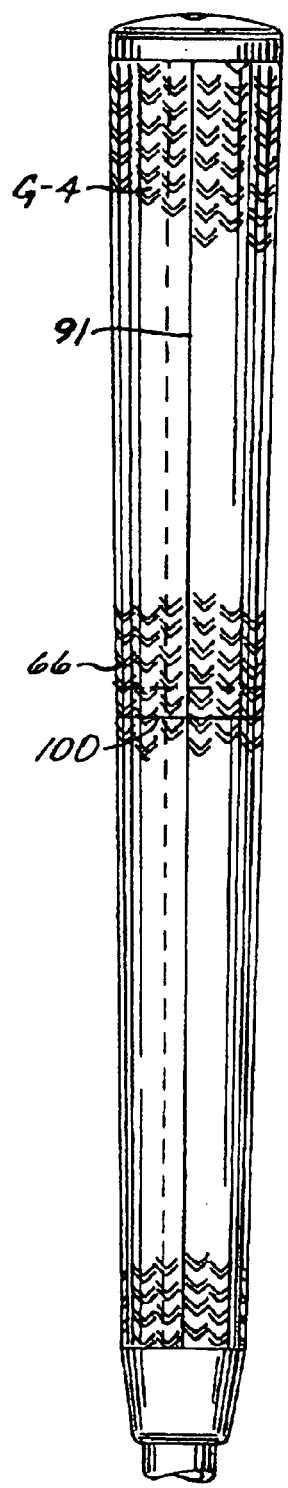
FIG. 48 is a front view of a multi-segment single panel grip as in FIG. 30, ready for modification.
Figure 49:
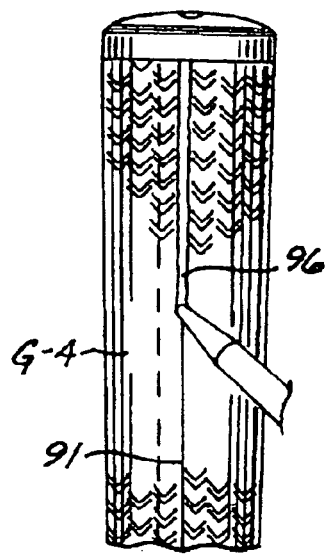
FIG. 49 is a broken front view showing a first step in the modification of the grip shown in FIG. 48.
Figure 50:
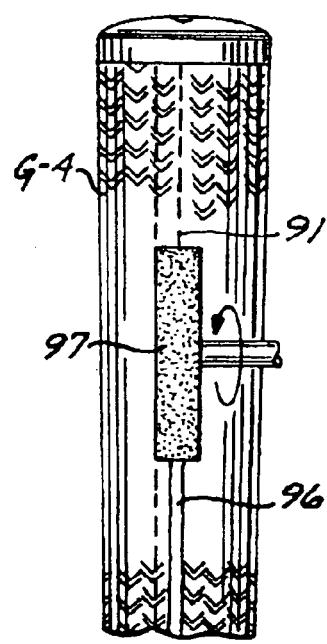
FIG. 50 is a broken front view showing a second step in the modification of the grip shown in FIG. 48.

As indicated in FIGS. 33, 34, and 35, the skived side edges 134, 136 of the panel S will be adhered together by a suitable adhesive 90 so as to define a vertical seam 91 extending through the panel. Because of the skived side edges 134, 136, the seam 91 extends through the panel S at an angle relative to the depth of the panel S so as to increase the length of such seam as compared to a seam extending parallel to the depth of the panel. Increased length of the seam affords a stronger bond. The seam is particularly strong where it joins the inside layers together, i.e. the felt—felt bond as shown in FIG. 35.

A suitable adhesive 90 has the chemical formula polychloroprene ($C_4H_5Cl$) and Toluene ($CH_5CH_3$). As the panel S is being wrapped about and adhered to underlisting sleeve U, the sleeve will be temporarily supported on a collapsible mandrel 92 in a conventional manner.

Figure 30:
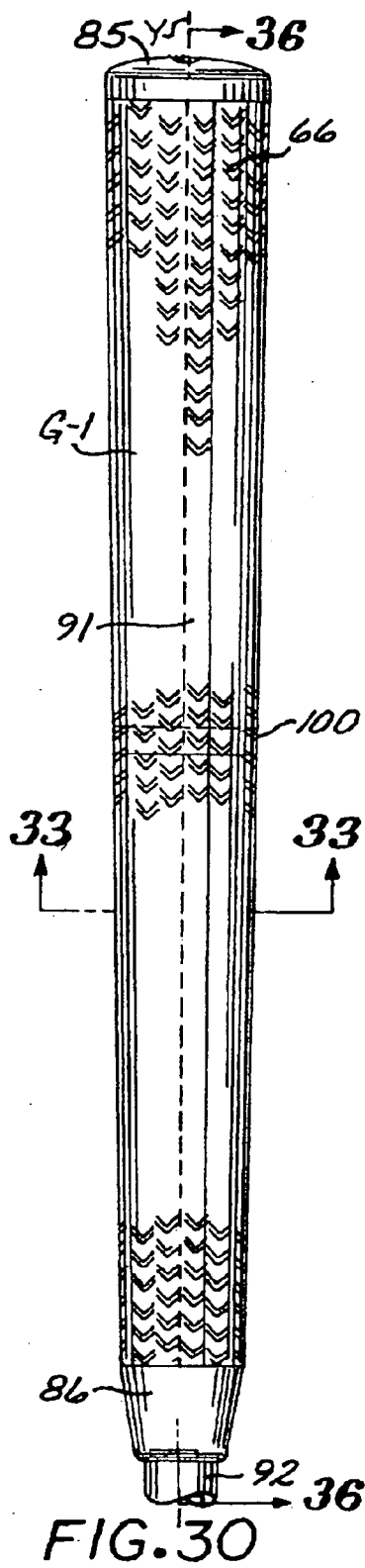
FIG. 30 is a front view showing the multi-segment single panel adhered to an underlisting sleeve.
Figure 31:
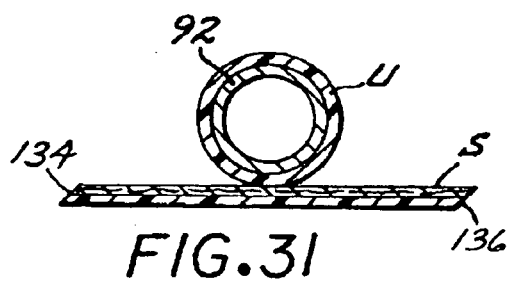
FIG. 31 is a horizontal cross-sectional view of FIG. 28.
Figure 32:
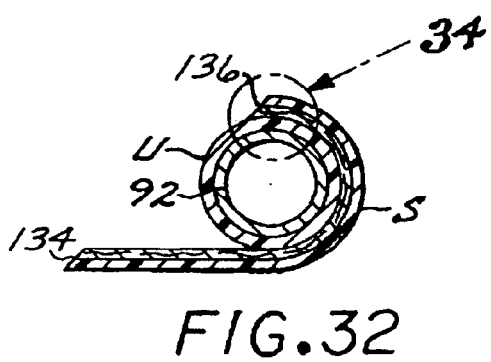
FIG. 32 is a horizontal cross-sectional view of FIG. 29.

In one embodiment, the seam 91 is left alone and the completed grip G-1 resembles the grip in FIG. 30. FIG. 36 shows a cross-sectional view taken along the line designated 36—36 (FIG. 30) of the multi-segment single panel S and the underlisting U showing the horizontal seam 100 relative to the length of the grip G-1. It will be appreciated by those of skill in the art that various advantages of the invention can be achieved by other types of seams. However, a seam transverse to the longitudinal axis Y of the sleeve U and, therefore, the longitudinal axis of the grip G-1 is preferred. As used herein, transverse seam is a broad term and includes diagonal seams, zigzag seams and wavy seams. Further, it is desirable that the seam is closer to horizontal than vertical. This view would be substantially the same for all grips G constructed as described above. The use of more panels would result in correspondingly more horizontal seams.

FIG. 36A is an enlarged view of the encircled portion designated 36A in FIG. 36. It shows the horizontal seam 100. Further, it shows how the skived bottom edge of the first panel S1 is skived from the inside layer 62a to the outside layer 60a so as to form an obtuse angle α with the inner surface 63a of the first panel S1. It also shows how the skived top edge of the second panel S2 is skived from the outside layer 60b to the inside layer 62b so as to form an obtuse angle β with the outer surface 61b of the second panel S2. Notably, it is preferred that obtuse angle α and obtuse angle β are equal such that when panel S1 is joined to panel S2, they form a substantially flat single panel S (viewed in cross-section as in FIG. 36A).

FIGS. 42 and 43 show enlarged cross-sectional views along the lines designated 42—42 and 43—43, respectively, in FIG. 41. They demonstrate the final placement of the top and bottom edges 130, 132 of the panel S after the panel S has been adhered to the underlisting U. It will be seen that the top edge 130 of the panel S is securely disposed within the cap slot 87. Similarly, the bottom edge 132 is securely disposed within the nipple slot 88. The complete grip is then removed from the mandrel 92 and is ready to be slipped onto and adhered to the shaft of a golf club GC in a conventional manner.

Referring now to FIGS. 37–39, an embodiment is shown after the side edges 134, 136 of the panel S have been adhered together. FIG. 37 shows the underlisting sleeve U supported by mandrel 92 upon a base 93 while a longitudinally extending heated pressure tooth 94 is urged against the polyurethane layer 110 at the outer edge of seam 91. Such heated tooth forms a small depression 95 in the polyurethane layer 110 aligned with the outer edge of the seam 91 so as to further strengthen such seam. An embodiment of a completed grip G-2 after the use of the tooth 94 is shown in FIG. 41.

FIGS. 44–47 show another embodiment of a golf club grip G-3, similar in all respects to grip G-2 with the exception that the channel 95 is filled with hot polyurethane 96 by a nozzle, brush or the like (FIG. 44). After the polyurethane hardens, it can be buffed by a suitable brush 97 or the like to smoothly blend into the surface of the grip as shown in FIG. 45. Alternatively, after channel 95 is not buffed after it is filled with hot polyurethane.

Figure 51:
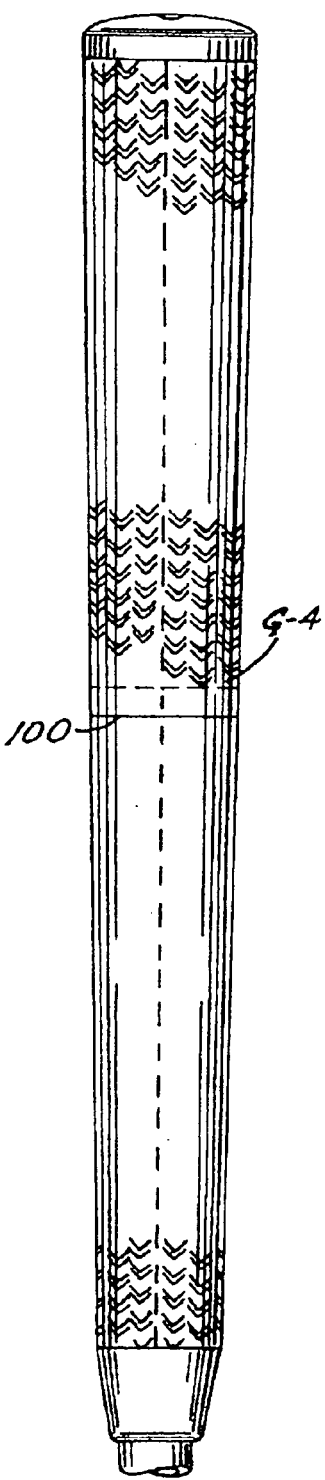
FIG. 51 is a front view of the grip made in accordance with FIGS. 48–50.

Referring now to FIGS. 48–51, there is shown another embodiment of a grip G-4. Grip G-4 does not use the channel 95. Rather, seam 91 is coated by a small quantity of hot polyurethane 96 by means of a nozzle, brush or the like, as shown in FIG. 47. After the polyurethane hardens, it may be buffed by a suitable brush 97 or the like to smoothly blend into the surface of the grip, as indicated in FIG. 51. Alternatively, the polyurethane is not buffed or blended.

Figure 52:
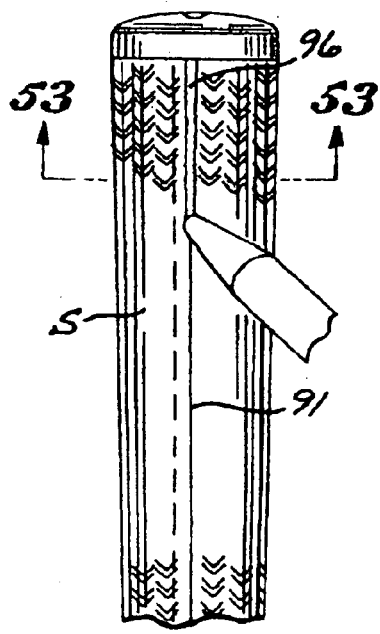
FIG. 52 is a broken front view showing another modification of the grip shown in FIG. 48.
Figure 55:
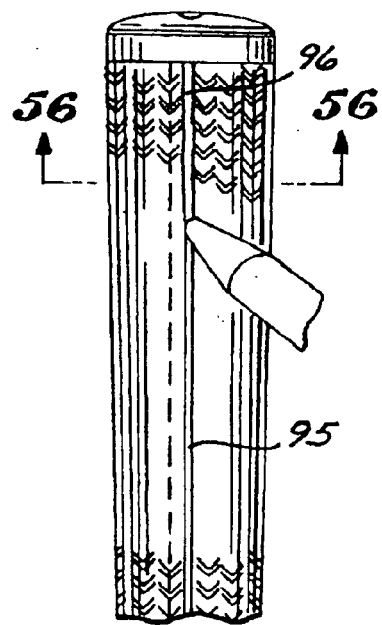
FIG. 55 is a broken front view showing another modification of the grip shown in FIG. 48.
Figure 53:
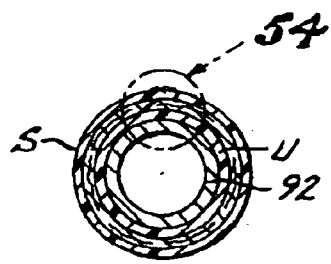
FIG. 53 is a horizontal cross-sectional view taken along the line 53—53 of FIG. 52.
Figure 56:
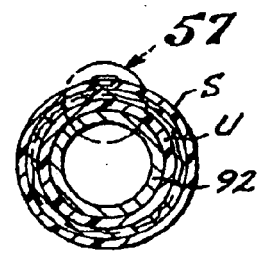
FIG. 56 is a horizontal cross-sectional view taken along the line 56—56 of FIG. 55.
Figure 54:
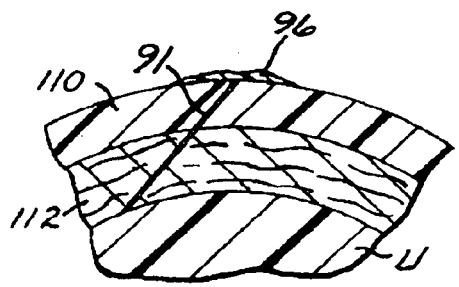
FIG. 54 is an enlarged view of the encircled area designated 54 in FIG. 53.
Figure 57:
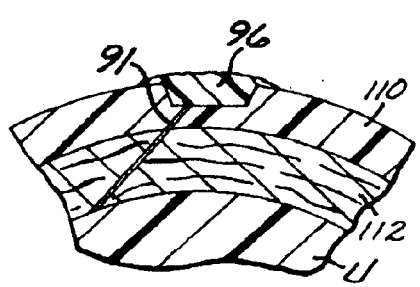
FIG. 57 is an enlarged view of the encircled area designated 57 in FIG. 56.
Figure 63:
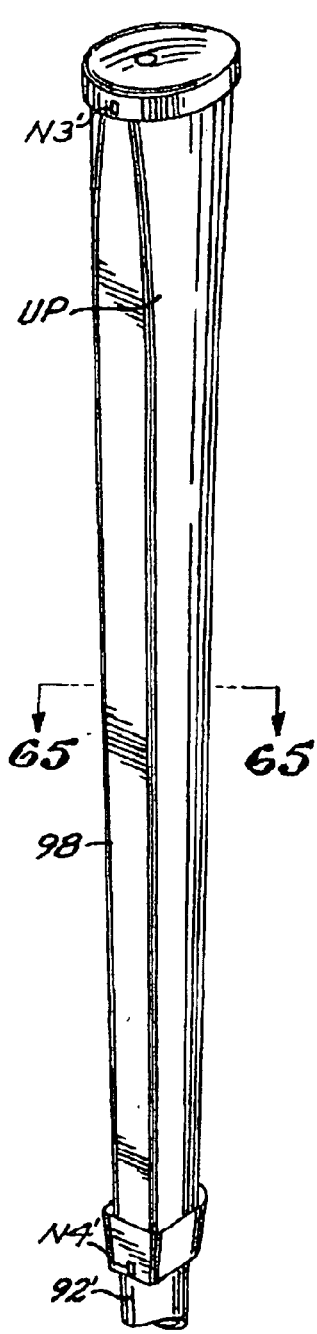
FIG. 63 is a perspective view of an underlisting sleeve of a putter grip according to an embodiment of the present invention.
Figure 64:
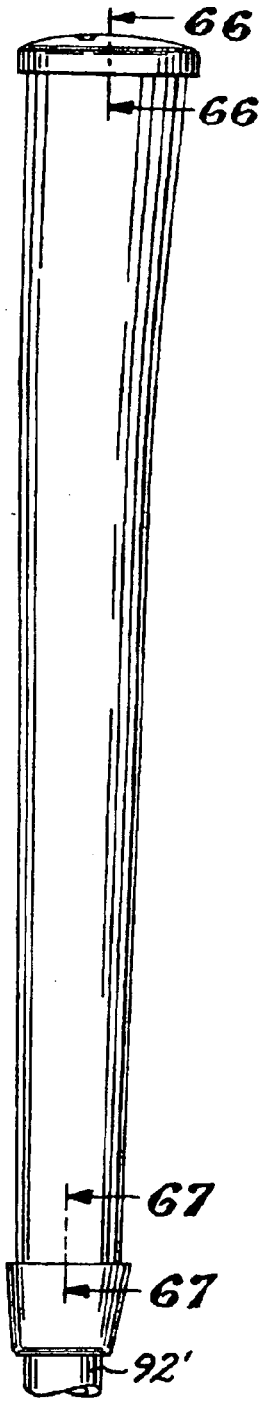
FIG. 64 is a rear view of the underlisting sleeve of FIG. 63.
Figure 65:
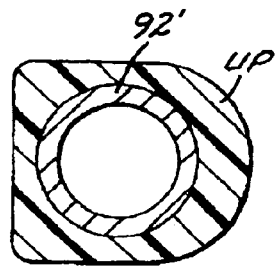
FIG. 65 is a horizontal cross-sectional view taken along the line 65—65 of FIG. 63.
Figure 66:
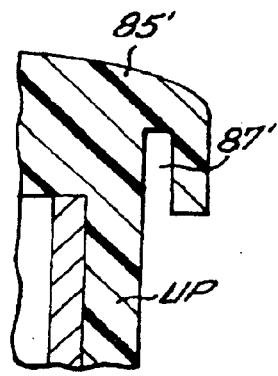
FIG. 66 is a vertical cross-sectional view taken along the line 66—66 of FIG. 64.
Figure 67:
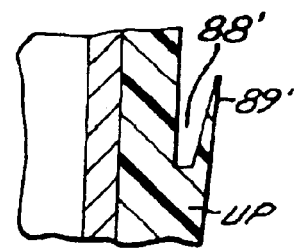
FIG. 67 is a vertical cross-sectional view taken along the line 67—67 of FIG. 64.

Referring to FIGS. 52–62, there is shown a modification of the grips of FIGS. 28–51. In FIGS. 52–54, hot polyurethane 96 is shown being coated over the seam 91 by a nozzle, brush or the like. In FIGS. 55–57, hot polyurethane 96 is shown filling the channel 95 by a nozzle, brush or the like. FIG. 58 shows a mold M-2 having a heated platen 140 the underside of which is formed with a segment 66a of the friction enhancing pattern 66 which is embossed on the surface of the polyurethane layer 110 of the grip. Such heated platen 140 is depressed against the outer surface of the polyurethane layer over the area of the seam 91 while the polyurethane is still hot. With this arrangement, the area of the exterior of the polyurethane layer 110 outwardly of the seam is formed with the friction enhancing segment of FIG. 59 whereby such segment merges with the friction enhancing pattern 66 molded on the main body of the outer surface of the grip. FIG. 62 shows such a grip G-5 with the merged friction enhancing pattern 66 placed over and adhered to a golf club shaft 55. Alternatively, in a preferred embodiment, the heated platen 140 may be urged against the naked seam 91 to form the friction enhancing pattern without first coating it with hot polyurethane 96. Pressing the pattern 66 directly to the seam 91 eliminates a step in the production process and therefore reduces the costs of production.

Referring now to FIGS. 63–71, there is shown a multi-segment single panel putter grip PG for use with a conventional putter. The grip PG includes a resilient underlisting sleeve UP (FIGS. 63–67) which is generally similar to the aforedescribed underlisting U, except that underlisting sleeve UP is not of an annular configuration. Instead, the front surface 98 of the underlisting sleeve UP is of flat configuration in accordance with the design of most putters in general use. It should be understood that underlisting sleeve UP receives a multi-segment single panel SP of polyurethane-felt configuration, similar to the aforedescribed multi-segment single panel S. The side edges of the putter panel SP are generally straight giving the panel SP a somewhat trapezoidal appearance prior to being wrapped around and adhered to the underlisting sleeve UP.

Figure 68A:
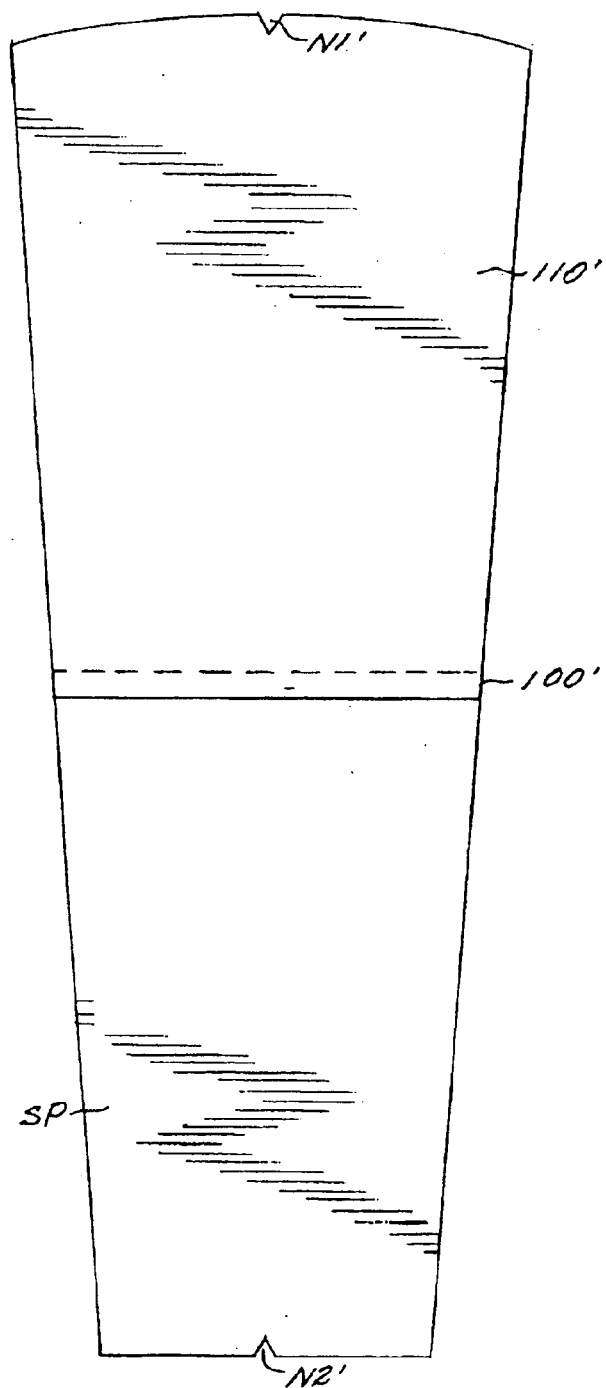
FIG. 68A is a front view of the multi-segment polyurethane-felt panel member of a golf club putter grip according to an embodiment of the present invention.
Figure 68B:
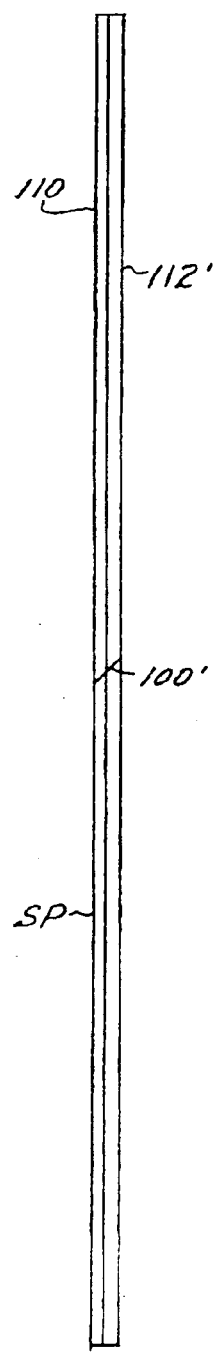
FIG. 68B is a side view of the multi-segment polyurethane-felt panel member of a golf club putter grip according to an embodiment of the present invention.
Figure 69:
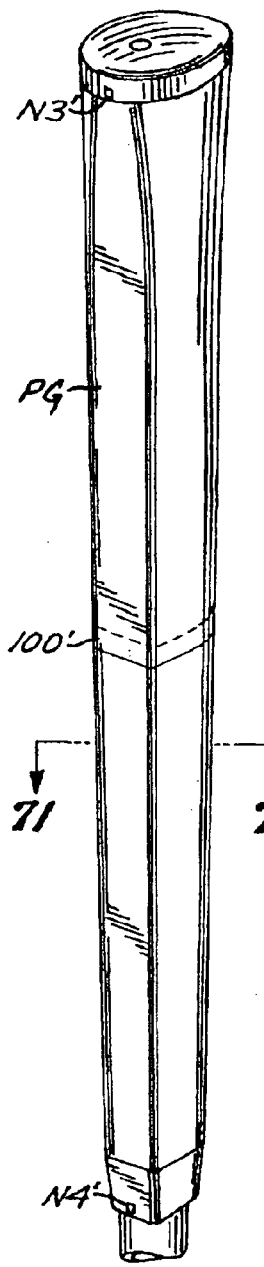
FIG. 69 is a perspective front view of a completed multi-segment single panel putter grip according to an embodiment of the present invention.
Figure 70:
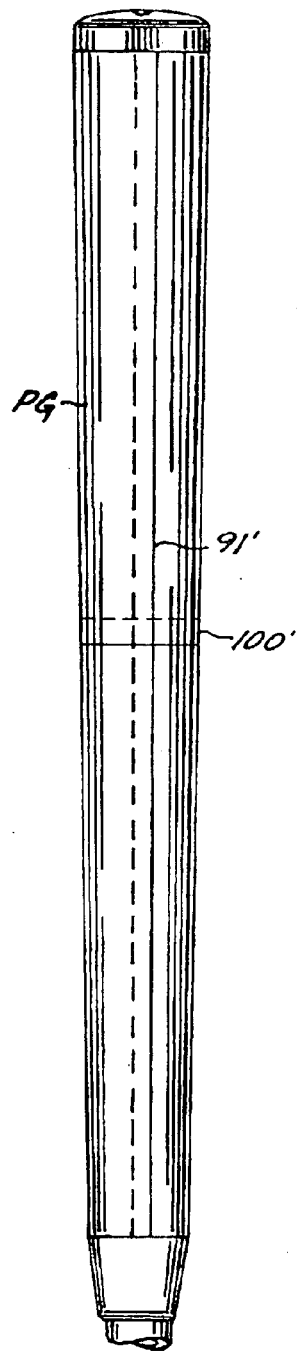
FIG. 70 is a rear view of the putter grip of FIG. 69.
Figure 71:
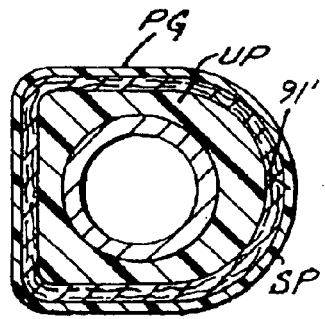
FIG. 71 is a horizontal sectional view taken along the line 71—71 of FIG. 69.
Figure 74A:
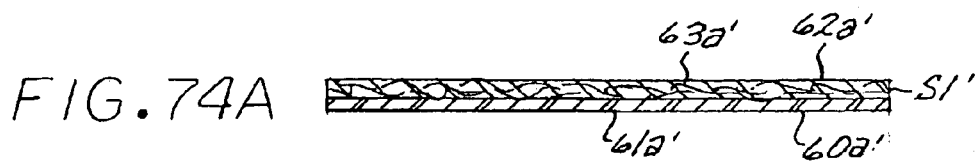
FIG. 74A is a horizontal cross-sectional view taken along line 74A—74A of FIG. 72A.
Figure 74B:
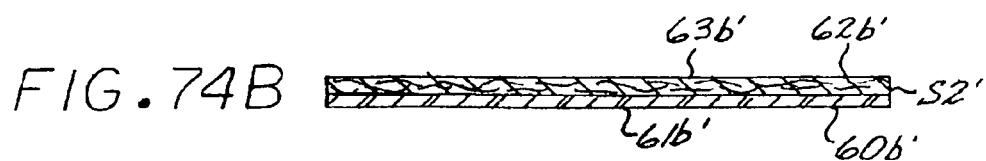
FIG. 74B is a horizontal cross-sectional view taken along line 74B—74B of FIG. 72B.
Figure 74C:
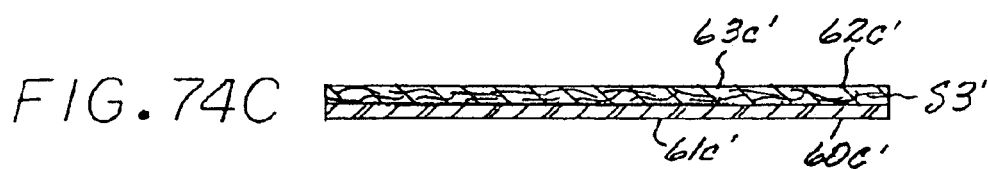
FIG. 74C is a horizontal cross-sectional view taken along line 74C—74C of FIG. 72C.

Such single panel SP is wrapped about and adhered to the underlisting sleeve in the same manner as described hereinbefore with respect to the multi-segment single panel grips G-1–G-4, with like parts of the two grips marked with like reference numerals. Similarly, if a tooth 94' is used to create a channel 95', it may be left alone or filled with hot polyurethane 96' and then left raw or buffed with a brush 97' or the like (refer to FIGS. 37–62 for examples of possible modifications to the grips herein disclosed). In a preferred embodiment, the panel SP is smooth but for a visual indicia such as logo 114' at the bottom end, as shown in FIG. 68. Because a putter is generally subjected to less forces due to the shortened putting swing as compared to the generally longer swing associated with other clubs, the putter grip PG generally does not require the friction enhancing pattern 66. However, it is contemplated that such a pattern can be molded into the putter panel SP as hereindescribed above.

It should be noted that any number of panels may be bonded together to form a multi-segment single panel grip. Preferably, the number is between 2 and 10, more preferably, between 2 and 5 and, most preferably, between 2 and 3. Referring now to FIGS. 72–79, another preferred embodiment is shown using 3 polyurethane-felt panels S1', S2' and S3', respectively. Like parts of the grips are marked with like reference numerals used above, distinguished by a prime symbol.

FIGS. 72a, 72b and 72c are front views showing, respectively: the top panel S1', the bottom panel S2', and the middle panel S3'. In one embodiment, the top and bottom panels S1', S2' are generally of equal size while the middle panel S3' is shorter. Despite their differing lengths, each of the panels S1', S2', S3' have substantially the same width such that when they are bonded together, they form a single, contiguous panel with side edges large enough to accept a press cut assembly to form a shaped panel S' whose width substantially corresponds to the circumference of the underlisting sleeve U'.

FIGS. 73a–74c show vertical and horizontal cross-sectional views of the panels in FIGS. 72a–c taken along the designated lines. The panels in this three-panel embodiment and all other embodiments of differing numbers of panels are created as described above in reference to FIGS. 1–3.

Figure 75:
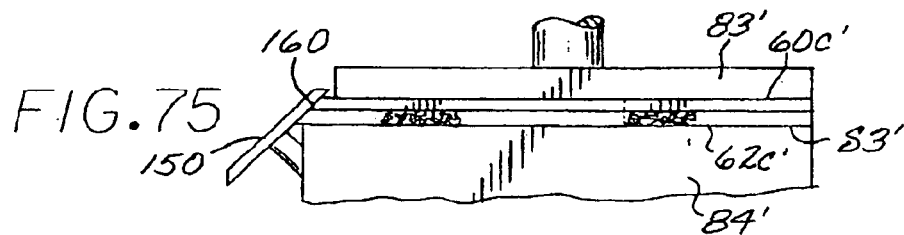
FIG. 75 shows the top edge of the middle segment S3' of FIG. 72B being skived.
Figure 76:
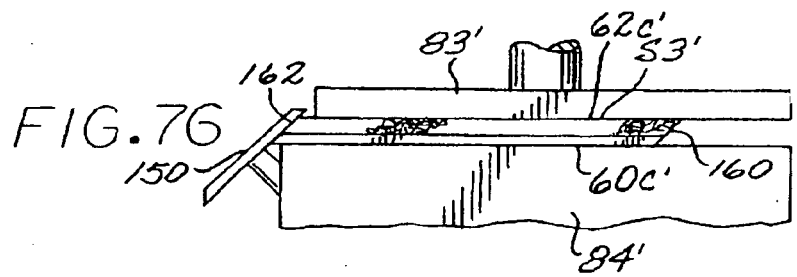
FIG. 76 shows the bottom edge of the middle segment S3' of FIG. 72B being skived.
Figure 77A:
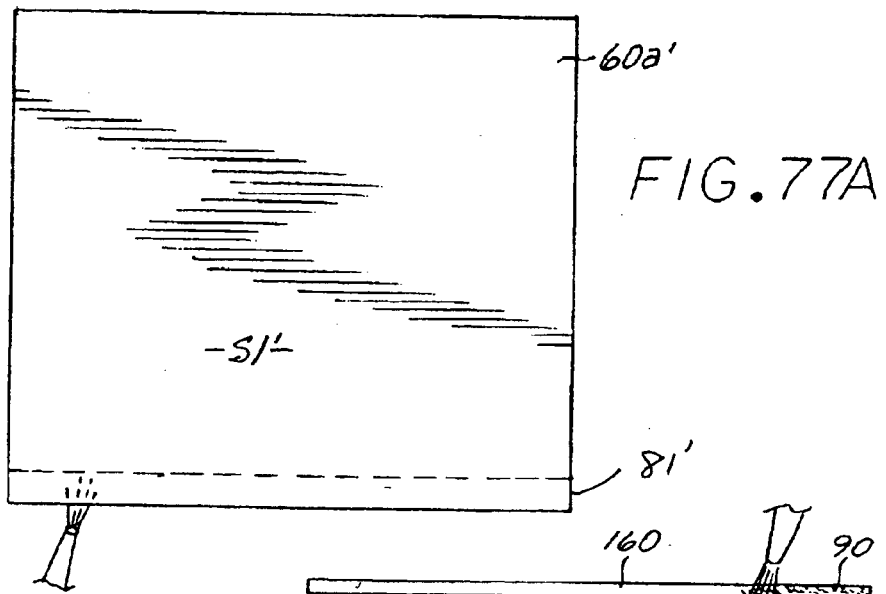
FIG. 77A is a front view showing adhesive being applied to the skived edge of the panel member.
Figure 77C:
FIG. 77C is a front view showing adhesive being applied to the skived edge of the panel member.
Figure 77B:
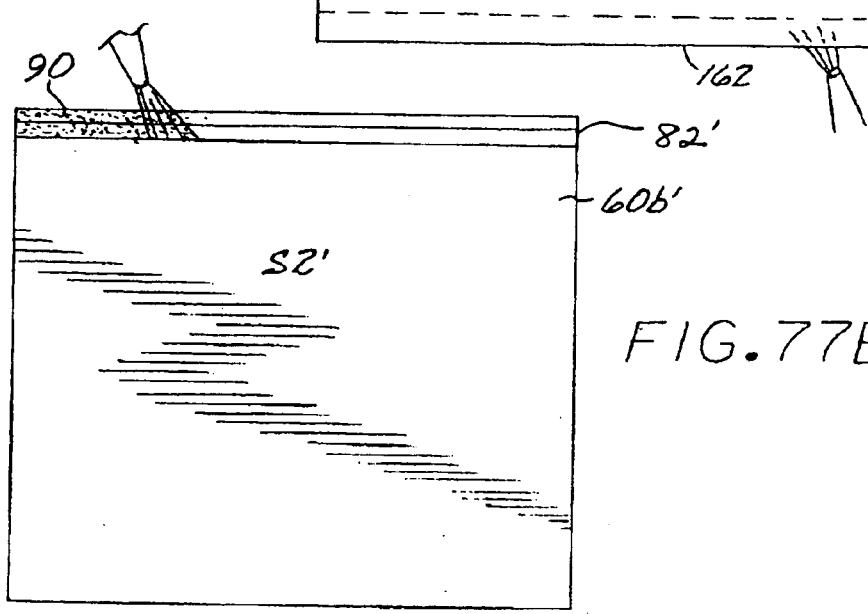
FIG. 77B is a front view showing adhesive being applied to the skived edge of the panel member.

Similar to the two-panel multi-segment single panel MP, the three-panel multi-segment single panel MP' requires some preparation. Top and bottom panels S1', S2' are skived as panels S1, S2 above, resulting in skived edges 81', 82' (FIGS. 77A and 77B). See FIGS. 4 and 5 for the method used to skive panels S1', S2'. FIGS. 75 and 76 show the skiving process for the middle panel S3'. Knife 150 is shown skiving the top edge 160 of the middle segment S3' downwardly and outwardly from the outside layer 60c' to the inside layer 62c' (FIG. 75) and the bottom edge 162 from the inside layer 62c' to the outside layer 60c' after the top edge 160 has been skived (FIG. 76). A pressure plate 83' is utilized to secure the panel on base 84' during the skiving operation. It will be noted that the skiving on the opposite ends of the panel S3' are parallel to one another, as seen in FIG. 76. Preferably, the skiving will again have a width of about 4.0–6.0 millimeters.

FIGS. 77a–b are front views showing adhesive 90 being applied to edges 81', 82', 160, 162 with a nozzle, brush or the like.

Figure 78:
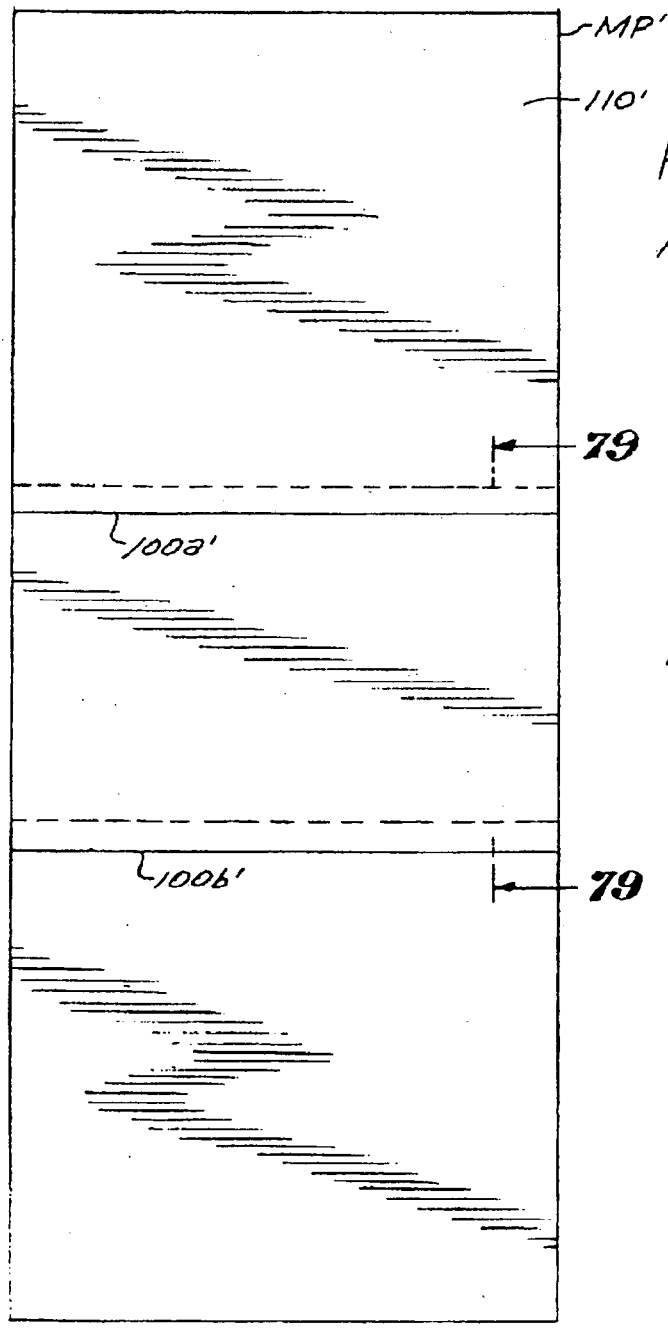
FIG. 78 is a front view of a multi-segment polyurethane-felt panel member of a golf club grip prior to being press cut to its working shape.

After application of the adhesive 90, the edges 81', 162, 160, 82' are pressed together such that the once separate polyurethane-felt panels S1', S2', S3' now form a contiguous multi-segment panel MP' with two substantially horizontal seams 100a', 100b', as shown in FIG. 78.

Figure 79:
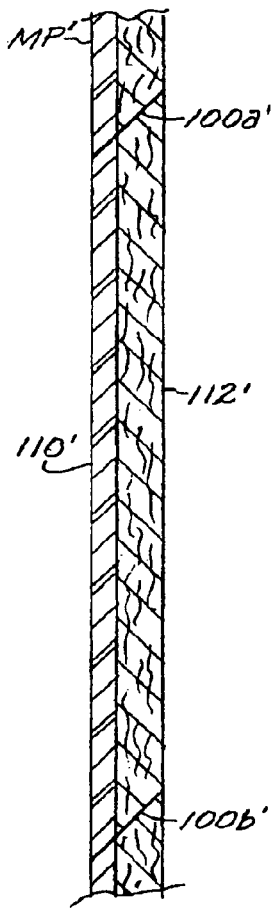
FIG. 79 is a vertical cross-sectional view taken along the line designated 79—79 in FIG. 78.

FIG. 79 is a horizontal sectional view taken along the line designated 79—79 in FIG. 78. Note the felt—felt bonds between the top panel S1' and the middle panel S3' and the middle panel S3' and the bottom panel S2'. These felt—felt bonding sections add structural integrity to the contiguous panel MP'. The panels S1', S2', S3' are bonded together such that their polyurethane layers 60a', 60b', 60c' form a contiguous polyurethane side 110' and their felt layers 62a', 62b', 62c' form a contiguous felt side 112'

Figures 80, 80A:
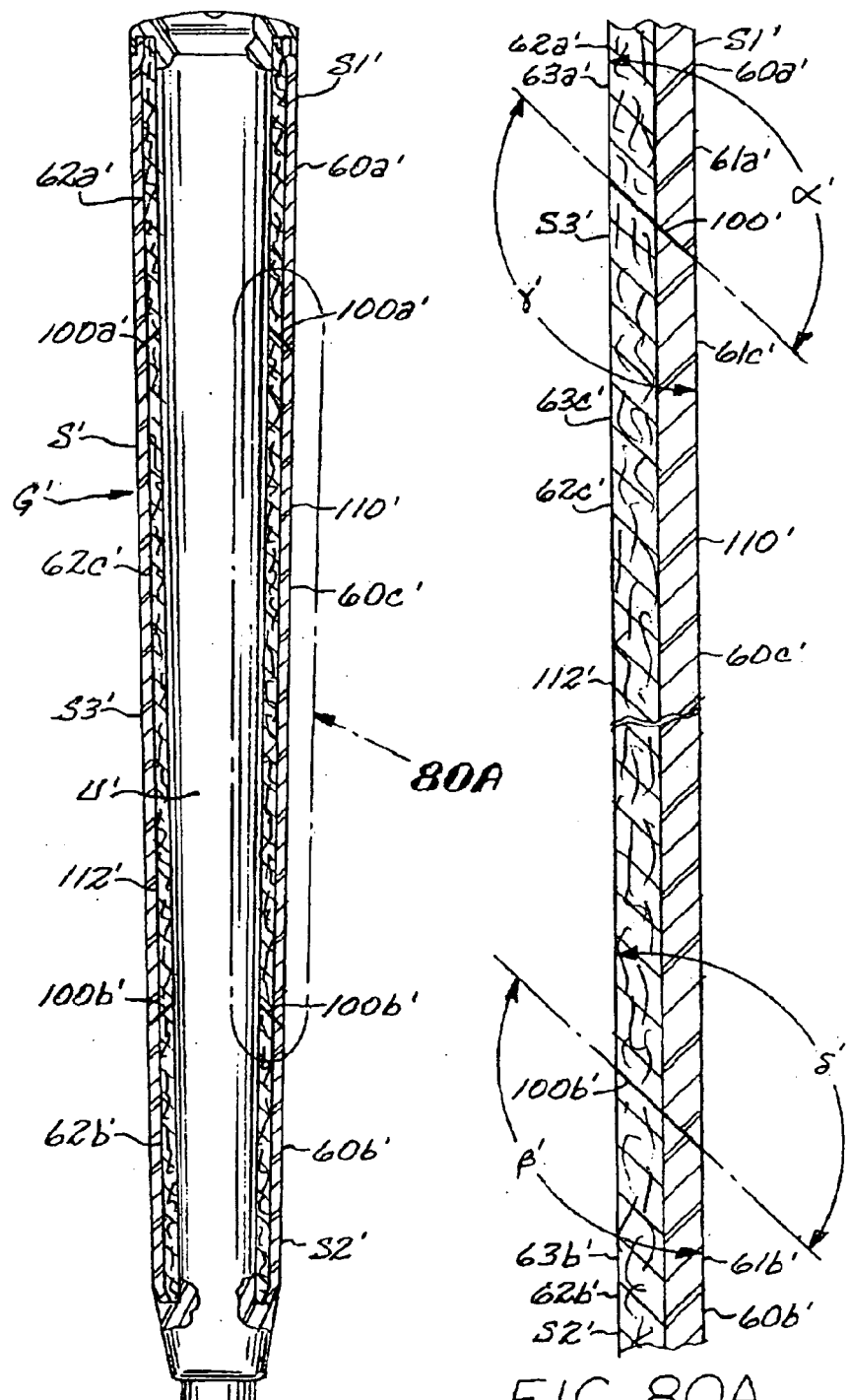
FIG. 80 is a vertical cross-sectional view of a completed grip.
FIG. 80A is an enlarged view of the encircled area designated 80A of FIG. 80.

FIG. 80 shows a cross-sectional view of a completed three-panel multi segment grip G' showing the two substantially horizontal seams 100a', 100b' relative to the length of the grip G'.

FIG. 80A is an enlarged view of the encircled portion designated 80A in FIG. 80. It shows the substantially horizontal seams 100a', 100b'. Particularly, it shows abutting seam 100a is constructed with the skived backside bottom edge of the first panel S1' first panel S1 is skived frontside top edge of the third panel S3'. The skived bottom edge of the first panel S1 is skived from the inside layer 62a' to the outside layer 60a' so as to form an obtuse angle α' with the inner surface 63a' of the first panel S1'. The skived top edge of the third panel S3 is skived from the outside layer 60c' to the inside layer 62c' so as to form an obtuse angle γ' with the outer surface 61c' of the third panel S3'. Seam 100b' is shown in a similar fashion. The skived bottom edge of the third panel S3' is skived from the inside layer 62c to the outside layer 60c' so as to form an obtuse angle δ' with the inner surface 63c' of the third panel S2'. The skived top edge of the second panel S2' is skived from the outside layer 60b to the inside layer 62b' so as to form an obtuse angle β' with the outer surface 61b' of the second panel S2'. Notably, it is preferred that obtuse angle α' and obtuse angle γ' are equal such that when panel S1' is joined to panel S3', they form a portion of substantially flat single panel S'(viewed in cross-section in FIG. 80A). Likewise, it is preferred that obtuse angle δ' and obtuse angle β' are equal such that when panel S3' is joined to panel S2', they too form a portion of substantially flat single panel S' (also viewed in cross-section in FIG. 80A).

Referring now to FIG. 81, there is shown a golf club GC having a handle 55 upon which has been telescopically secured a grip G made in accordance with the disclosure herein contained. FIG. 82 shows a putter grip PG which is telescopically applied to the handle 57 of a putter P.

It should be understood that the outer surface of a grip embodying the present invention may be coated by means of a brush, nozzle, spray or the like with a thin layer of polyurethane (not shown) to protect such surface, add tackiness thereto and increase the durability thereof.

A golf club grip of the present invention provides the advantages over the existing wrapped and single panel grips described hereinbefore. Additionally, such grip has the appearance of a molded, one-piece grip familiar to professional and low-handicap golfers. Although some of such golfers are reluctant to use a non-traditional wrapped club, they are willing to play with a structurally integral multi-segment grip of the present invention since such grip affords the shock absorbing and tackiness qualities of a wrapped grip. Further, many individual golfers and high school, college, and professional teams like the camaraderie and unification that can be achieved by putting team colors on their golf grips without sacrificing comfort, durability or tackiness. My present invention allows the application of the multiple colors to golf club and putter grips to allow these teams and individuals to express their spirit and enthusiasm in a way never before possible.

Further details of the single panel grip and its applications are described in U.S. patent application Ser. No. 10/392,480, filed on Mar. 18, 2003, which is herein incorporated by reference in its entirety.

It will be understood that the foregoing is only illustrative of the principles of the invention, and that various modifications, alterations, and combinations can be made by those skilled in the art without departing from the scope and spirit of the invention.

What is claimed is:

1. A grip for the handle of a golf club, said grip comprising:

a resilient underlisting sleeve having an opening at one end sized so that said sleeve is telescopically slippable onto the handle of a golf club;

said sleeve including a cap and a nipple;

said cap defining a downwardly facing circumferential slot;

said nipple defining an upwardly facing circumferential slot;

a first panel including a polyurethane outside layer bonded to a felt inside layer, said first panel having a top edge, a bottom edge and two side edges extending between said top edge and said bottom edge, said inside layer defining an inner surface of said first panel;

a second panel including a polyurethane outside layer bonded to a felt inside layer, said second panel having a top edge, a bottom edge and two side edges extending between said top edge and said bottom edge, said outside layer defining an outer surface of said second panel;

said first panel defining a skived bottom edge having skiving extending from the inside layer to the outside layer so as to form an obtuse angle with said inner surface of said first panel;

said second panel defining a skived top edge having skiving extending from the outside layer to the inside layer so as to form an obtuse angle with said outer surface of said second panel;

said bottom edge of said first panel abuts and is adhered to said top edge of said second panel;

said first panel and said second panel wrapped about and adhered to said underlisting sleeve so that said bottom edge of said first panel and said top edge of said second panel cooperate to form a substantially horizontal seam.

2. The grip of claim 1, wherein said outside layer further comprises a pressed friction enhancing pattern.

3. The grip of claim 1, wherein said outside layer further comprises a pressed logo.

4. The grip of claim 1, wherein said outside layer further comprises an inked logo.

5. The grip of claim 1, wherein said grip is a putter grip and said sleeve defines a flat front surface.

6. A grip for the handle of a golf club, said grip comprising:

a resilient underlisting sleeve having an opening at one end sized so that said sleeve is telescopically slippable onto the handle of a golf club;

said sleeve including a cap and a nipple;

said cap defining a downwardly facing circumferential slot;

said nipple defining an upwardly facing circumferential slot;

a first panel including a polyurethane outside layer bonded to a felt inside layer, said first panel having a top edge, a bottom edge and two side edges extending between said top edge and said bottom edge, said inside layer defining an inner surface of said first panel;

a second panel including a polyurethane outside layer bonded to a felt inside layer, said second panel having a top edge, a bottom edge and two side edges extending between said top edge and said bottom edge, said outside layer defining an outer surface of said second panel;

a third panel including a polyurethane outside layer bonded to a felt inside layer, said third panel having a top edge, a bottom edge and two side edges extending between said top edge and said bottom edge, said outside layer defining an outer surface of said second panel and said inside layer defining an inner surface of said second panel;

said first panel defining a skived bottom edge having skiving extending from the inside layer to the outside layer so as to form an obtuse angle with said inner surface of said first panel;

said second panel defining a skived top edge having skiving extending from the outside layer to the inside layer so as to form an obtuse angle with said outer surface of said second panel;

said third panel defining a skived top edge having skiving extending from the outside layer to the inside layer so as to form an obtuse angle with; said outer surface of said third panel;

said third panel further defining a skived bottom edge having skiving extending from the inside layer to the outside layer so as to form an obtuse angle with said inner surface of said third panel;

said bottom edge of said first panel abuts and is adhered to said top edge of said third panel;

said bottom edge of said third panel abuts and is adhered to said top edge of said second panel;

said first panel and said third panel wrapped about and adhered to said underlisting sleeve so that said bottom edge of said first panel and said top edge of said third panel cooperate to form a substantially horizontal seam;

said third panel and said second panel wrapped about and adhered to said underlisting sleeve so that said bottom edge of said third panel and said top edge of said second panel cooperate to form a substantially horizontal seam.

7. The grip of claim 6, wherein said outside layer further comprises a pressed friction enhancing pattern.

8. The grip of claim 6, wherein said outside layer further comprises a pressed logo.

9. The grip of claim 6, wherein said outside layer further comprises an inked logo.

10. The grip of claim 6, wherein said grip is a putter grip and said sleeve defines a flat front surface.

11. A grip for the handle of a golf club, said grip comprising:

a resilient underlisting sleeve having an opening at one end sized so that said sleeve is telescopically slippable onto the handle of a golf club;

a first panel including a polymeric outside layer bonded to a fabric inside layer, said first panel having a top edge, a bottom edge and two side edges extending between said top edge and said bottom edge;

a second panel including a polymeric outside layer bonded to a fabric inside layer, said second panel having a top edge, a bottom edge and two side edges extending between said top edge and said bottom edge;

said first panel defining a skived bottom edge;

said second panel defining a skived top edge;

said bottom edge of said first panel abuts said top edge of said second panel;

said first panel and said second panel wrapped about and adhered to said underlisting sleeve so that said bottom edge of said first panel and said top edge of said second panel cooperate to form a substantially horizontal seam.

12. The grip of claim 11, wherein said bottom edge of said first panel is secured to said top edge of said second panel.

13. The grip of claim 12, wherein the first panel defines an inner surface and the skived bottom edge of the first panel has skiving extending from the inside layer to the outside layer so as to form an obtuse angle with the inner surface of said first panel.

14. The grip of claim 13, wherein the second panel defines an outer surface and the skived top edge of the second panel has skiving extending from the outside layer to the inside layer so as to form an obtuse angle with the outer surface of the second panel.

15. The grip of claim 11, further comprising a cap having a downwardly facing circumferential slot which receives said top edge of said first panel and a lower nipple having an upwardly facing circumferential slot which receives said bottom edge of said second panel.

16. The grip of claim 11, wherein said top edge of said first panel is generally horizontal and said bottom edge of said second panel is generally horizontal, further comprising a cap having a downwardly facing slot which receives said top edge of said first panel and a lower nipple having an upwardly facing slot which receives said bottom edge of said second panel.

17. The grip of claim 11, wherein said outside layer further comprises a pressed friction enhancing pattern.

18. The grip of claim 11, wherein said outside layer further comprises a pressed logo.

19. The grip of claim 11, wherein said outside layer further comprises an inked logo.

20. The grip of claim 11, wherein said grip is a putter grip and said sleeve defines a flat front surface.

21. A grip for the handle of a golf club, said grip comprising:
   an underlisting sleeve sized and having an opening at one end so that said sleeve is telescopically slippable onto the handle of a golf club, said sleeve defining a longitudinal axis;
   a first panel including a polymeric outside layer bonded to a fabric inside layer, said first panel having a top edge, a bottom edge and two side edges extending between said top edge and said bottom edge;
   a second panel including a polymeric outside layer bonded to a fabric inside layer, said second panel having a top edge, a bottom edge and two side edges extending between said top edge and said bottom edge;
   said inside layer and said outside layer of said bottom edge of said first panel being skived;
   said inside layer and said outside layer of said top edge of said second panel being skived;
   said inside layer of said first panel abutting said inside layer of said second panel and said bottom edge of said first panel being secured to said top edge of said bottom panel;
   said first panel and said second panel wrapped about and adhering to said underlisting sleeve;
   said bottom edge of said first panel and said top edge of said second panel cooperating to form a seam transverse to said longitudinal axis.

22. The grip of claim 21, wherein the bottom edge of said first panel defines a skived bottom edge which is skived from the inside layer to the outside layer so as to form an obtuse angle with the inner surface of said first panel.

23. The grip of claim 22, wherein the top edge of said second panel defines a skived top edge which is skived from the outside layer to the inside layer so as to form an obtuse angle with the outer surface of the second panel.

24. The grip of claim 21, further comprising a cap having a downwardly facing circumferential slot which receives said top edge of said first panel and a lower nipple having an upwardly facing circumferential slot which receives said bottom edge of said second panel.

25. The grip of claim 21, wherein said top edge of said first panel is generally horizontal and said bottom edge of said second panel is generally horizontal, further comprising a cap having a downwardly facing slot which receives said top edge of said first panel and a lower nipple having an upwardly facing slot which receives said bottom edge of said second panel.

26. The grip of claim 21, wherein said outside layer further comprises a pressed friction enhancing pattern.

27. The grip of claim 21, wherein said outside layer further comprises a pressed logo.

28. The grip of claim 21, wherein said outside layer further comprises an inked logo.

29. The grip of claim 21, wherein said grip is a putter grip and said sleeve defines a flat front surface.

30. A grip for the handle of a golf club, said grip comprising:
   an underlisting sleeve sized and having an opening at one end so that said sleeve is telescopically slippable onto the handle of a golf club;
   a first panel including a polymeric outside layer bonded to a fabric inside layer, said first panel having a top edge, a bottom edge and two side edges extending between said top edge and said bottom edge;
   a second panel including a polymeric outside layer bonded to a fabric inside layer, said second panel having a top edge, a bottom edge and two side edges extending between said top edge and said bottom edge;
   said inside layer and said outside layer of said bottom edge of said first panel being skived from said inside layer to said outside layer so as to form an obtuse angle with the inner surface of said first panel;
   said inside layer and said outside layer of said top edge of said second panel being skived from said outside layer to said inside layer so as to form an obtuse angle with the outer surface of said second panel;
   said bottom edge of said first panel abutting said top edge of said second panel;
   said first panel and said second panel wrapped about and adhered to said underlisting sleeve;
   said bottom edge of said first panel and said top edge of said second panel cooperating to form a substantially horizontal seam.

31. The grip of claim 30, wherein said bottom edge of said first panel is secured to said top edge of said second panel.

32. The grip of claim 31, further comprising a cap having a downwardly facing slot which receives said top edge of said first panel and a lower nipple having an upwardly facing slot which receives said bottom edge of said second panel.

33. The grip of claim 31, wherein said top edge of said first panel is generally horizontal and said bottom edge of said second panel is generally horizontal, further comprising a cap having a downwardly facing slot which receives said top edge of said first panel and a lower nipple having an upwardly facing slot which receives said bottom edge of said second panel.

34. The grip of claim 31, wherein said outside layer further comprises a pressed friction enhancing pattern.

35. The grip of claim 31, wherein said outside layer further comprises a pressed logo.

36. The grip of claim 31, wherein said outside layer further comprises an inked logo.

37. The grip of claim 31, wherein said grip is a putter grip and said sleeve defines a flat front surface.

38. A method of making a grip for the handle of a golf club, such method including the steps of:
- providing an underlisting sleeve that is telescopically slippable onto the handle of a golf club;
- providing a first panel including a polymeric outside layer bonded to a fabric inside layer, said first panel having a top edge, a bottom edge and two side edges extending between said top edge and said bottom edge;
- providing a second panel including a polymeric outside layer bonded to a fabric inside layer, said second panel having a top edge, a bottom edge and two side edges extending between said top edge and said bottom edge;
- skiving said bottom edge of said first panel;
- skiving said top edge of said second panel;
- securing said bottom edge of said first panel to said top edge of said bottom panel;
- wrapping said first panel about and adhering said first panel to said underlisting sleeve;
- wrapping said second panel about and adhering said second panel to said underlisting sleeve;
- whereby, upon completion of said securing step and said wrapping step, said bottom edge of said first panel and said top edge of said second panel cooperate to form a substantially horizontal seam.

39. The method of claim 38, wherein said bottom edge of said first panel is secured to said top edge of said second panel before said wrapping steps.

40. The method of claim 39, wherein said bottom edge of said first panel is skived from said inside layer to said outside layer so as to form an obtuse angle with the inner surface of said first panel.

41. The method of claim 40, wherein said top edge of said second panel is skived from said outside layer to said inside layer so as to form an obtuse angle with the outer surface of said second panel.

42. The method of claim 38, further comprising securing said top edge of said first panel into a downwardly facing circumferential slot of a cap and said bottom edge of said second panel into an upwardly facing circumferential slot of a lower nipple.

43. The method of claim 38, wherein said top edge of said first panel is generally horizontal and said bottom edge of said second panel is generally horizontal, further comprising securing said top edge of said first panel into a downwardly facing slot of a cap and said bottom edge of said second panel into an upwardly facing slot of a lower nipple.

44. The method of claim 38, further comprising pressing a friction enhancing pattern into said outside layer.

45. The method of claim 38, further comprising pressing a logo into said outside layer.

46. The method of claim 38, further comprising inking a logo onto said outside layer.

47. The method of claim 38, wherein said grip is a putter grip and said sleeve defines a flat front surface.

48. A method of making a grip for the handle of a golf club, such method including the steps of:
- providing an underlisting sleeve that is telescopically slippable onto the handle of a golf club;
- providing a first panel including a polymeric outside layer bonded to a fabric inside layer, said first panel having a top edge, a bottom edge and two side edges extending between said top edge and said bottom edge;
- providing a second panel including a polymeric outside layer bonded to a fabric inside layer, said second panel having a top edge, a bottom edge and two side edges extending between said top edge and said bottom edge;
- skiving said inside layer and said outside layer of said bottom edge of said first panel;
- skiving said inside layer and said outside layer of said top edge of said second panel;
- abutting said inside layer of said first panel to said inside layer of said second panel and securing said bottom edge of said first panel to said top edge of said bottom panel;
- wrapping said first panel about and adhering said first panel to said underlisting sleeve;
- wrapping said second panel about and adhering said second panel to said underlisting sleeve;
- whereby, upon completion of said securing step and said wrapping step, said bottom edge of said first panel and said top edge of said second panel cooperate to form a substantially horizontal seam.

49. The method of claim 48, wherein said bottom edge of said first panel is secured to said top edge of said second panel before said wrapping steps.

50. The method of claim 49, wherein said bottom edge of said first panel is skived from said inside layer to said outside layer so as to form an obtuse angle with the inner surface of said first panel.

51. The method of claim 50, wherein said top edge of said second panel is skived from said outside layer to said inside layer so as to form an obtuse angle with the outer surface of said second panel.

52. The method of claim 48, further comprising securing said top edge of said first panel into a downwardly facing circumferential slot of a cap and said bottom edge of said second panel into an upwardly facing circumferential slot of a lower nipple.

53. The method of claim 48, wherein said top edge of said first panel is generally horizontal and said bottom edge of said second panel is generally horizontal, further comprising securing said top edge of said first panel into a downwardly facing slot of a cap and said bottom edge of said second panel into an upwardly facing slot of a lower nipple.

54. The method of claim 48, further comprising pressing a friction enhancing pattern into said outside layer.

55. The method of claim 48, further comprising pressing a logo into said outside layer.

56. The method of claim 48, further comprising inking a logo onto said outside layer.

57. The method of claim 48, wherein said grip is a putter grip and said sleeve defines a flat front surface.

58. A method of making a grip for the handle of a golf club, such method including the steps of:
- providing an underlisting sleeve that is telescopically slippable onto the handle of a golf club;
- providing a first panel including a polymeric outside layer bonded to a fabric inside layer, said first panel having a top edge, a bottom edge and two side edges extending between said top edge and said bottom edge;
- providing a second panel including a polymeric outside layer bonded to a fabric inside layer, said second panel having a top edge, a bottom edge and two side edges extending between said top edge and said bottom edge;
- skiving said inside layer and said outside layer of said bottom edge of said first panel from said inside layer to said outside layer so as to form an obtuse angle with the inner surface of said first panel;
- skiving said inside layer and said outside layer of said top edge of said second panel from said outside layer to said inside layer so as to form an obtuse angle with the outer surface of said second panel;

abutting said bottom edge of said first panel to said top edge of said second panel;

wrapping said first panel about and adhering said first panel to said underlisting sleeve;

wrapping said second panel about and adhering said second panel to said underlisting sleeve;

whereby, upon completion of said securing step and said wrapping step, said bottom edge of said first panel and said top edge of said second panel cooperate to form a substantially horizontal seam.

59. The method of claim 58, wherein said bottom edge of said first panel is secured to said top edge of said second panel before said wrapping steps.

60. The method of claim 59, further comprising securing said top edge of said first panel into a downwardly facing circumferential slot of a cap and said bottom edge of said second panel into an upwardly facing circumferential slot of a lower nipple.

61. The method of claim 59, wherein said top edge of said first panel is generally horizontal and said bottom edge of said second panel is generally horizontal, further comprising securing said top edge of said first panel into a downwardly facing slot of a cap and said bottom edge of said second panel into an upwardly facing slot of a lower nipple.

62. The method of claim 58, further comprising pressing a friction enhancing pattern into said outside layer.

63. The method of claim 58, further comprising pressing a logo into said outside layer.

64. The method of claim 58, further comprising inking a logo onto said outside layer.

65. The method of claim 58, wherein said grip is a putter grip and said sleeve defines a flat front surface.

66. A grip for the handle of a golf club, said grip comprising:

a resilient underlisting sleeve sized and having a top end and a bottom end and being telescopically slippable onto the handle of a golf club;

a first panel including a polymeric outside layer bonded to a fabric inside layer, said first panel having a top edge, a bottom edge and two side edges extending between said top edge and said bottom edge;

a second panel including a polymeric outside layer bonded to a fabric inside layer, said second panel having a top edge, a bottom edge and two side edges extending between said top edge and said bottom edge;

a third panel including a polymeric outside layer bonded to a fabric inside layer, said third panel having a top edge, a bottom edge and two side edges extending between said top edge and said bottom edge;

said first panel defining a skived bottom edge;

said second panel defining a skived top edge;

said third panel defining a skived top edge and a skived bottom edge;

said bottom edge of said first panel abuts said top edge of said third panel;

said top edge of said first panel is positioned adjacent said top end of said sleeve and said bottom edge of said second panel is positioned adjacent said bottom end of said sleeve;

said first panel and said third panel wrapped about and adhered to said underlisting sleeve so that said bottom edge of said first panel and said top edge of said third panel cooperate to form a substantially horizontal seam;

said third panel and said second panel wrapped about and adhered to said underlisting sleeve so that said bottom edge of said third panel and said top edge of said second panel cooperate to form a substantially horizontal seam.

67. The grip of claim 66, wherein said bottom edge of said first panel is secured to said top edge of said third panel.

68. The grip of claim 67, wherein said bottom edge of said third panel is secured to said top edge of said second panel.

69. The grip of claim 68, wherein said bottom edge of said first panel is skived outward from said inside layer to said outside layer so as to form an obtuse angle with the inner surface of said first panel.

70. The grip of claim 68, further comprising a cap having a downwardly facing circumferential slot which receives said top edge of said first panel and a lower nipple having an upwardly facing circumferential slot which receives said bottom edge of said second panel.

71. The grip of claim 68, wherein said top edge of said first panel is generally horizontal and said bottom edge of said second panel is generally horizontal, further comprising a cap having a downwardly facing slot which receives said top edge of said first panel and a lower nipple having an upwardly facing slot which receives said bottom edge of said second panel.

72. The grip of claim 66, wherein said outside layer further comprises a pressed friction enhancing pattern.

73. The grip of claim 66, wherein said outside layer further comprises a pressed logo.

74. The grip of claim 66, wherein said outside layer further comprises an inked logo.

75. The grip of claim 66, wherein said grip is a putter grip and said sleeve defines a flat front surface.

76. A method of making a grip for the handle of a golf club, such method including the steps of:

providing an underlisting sleeve that is telescopically slippable onto the handle of a golf club;

providing a first panel including a polymeric outside layer bonded to a fabric inside layer, said first panel having a top edge, a bottom edge and two side edges extending between said top edge and said bottom edge;

providing a second panel including a polymeric outside layer bonded to a fabric inside layer, said second panel having a top edge, a bottom edge and two side edges extending between said top edge and said bottom edge;

providing a third panel including a polymeric outside layer bonded to a fabric inside layer, said second panel having a top edge, a bottom edge and two side edges extending between said top edge and said bottom edge;

skiving said bottom edge of said first panel;

skiving said top edge of said second panel;

skiving said top edge and said bottom edge of said third panel;

securing said bottom edge of said first panel to said top edge of said third panel;

securing said bottom edge of said third panel to said top edge of said second panel;

wrapping said first panel about and adhering said first panel to said underlisting sleeve;

wrapping said second panel about and adhering said second panel to said underlisting sleeve;

wrapping said third panel about and adhering said third panel to said underlisting sleeve;

whereby, upon completion of said securing step and said wrapping step, said bottom edge of said first panel and said top edge of said third panel cooperate to form a substantially horizontal seam and said bottom edge of said third panel and said top edge of said second panel cooperate to form a substantially horizontal seam.

77. The method of claim 76, wherein said bottom edge of said first panel is secured to said top edge of said third panel before said wrapping steps.

78. The method of claim 77, wherein said bottom edge of said first panel is skived from said inside layer to said outside layer so as to form an obtuse angle with the inner surface of said first panel.

79. The method of claim 76, further comprising securing said top edge of said first panel into a downwardly facing circumferential slot of a cap and said bottom edge of said second panel into an upwardly facing circumferential slot of a lower nipple.

80. The method of claim 76, wherein said top edge of said first panel is generally horizontal and said bottom edge of said second panel is generally horizontal, further comprising securing said top edge of said first panel into a downwardly facing slot of a cap and said bottom edge of said second panel into an upwardly facing slot of a lower nipple.

81. The method of claim 76, further comprising pressing a friction enhancing pattern into said outside layer.

82. The method of claim 76, further comprising pressing a logo into said outside layer.

83. The method of claim 76, further comprising inking a logo onto said outside layer.

84. The method of claim 76, wherein said grip is a putter grip and said sleeve defines a flat front surface.

* * * * *